United States Patent

Tsunekawa et al.

Patent Number: 6,090,898
Date of Patent: Jul. 18, 2000

[54] POLYESTER FILM AND A PRODUCTION PROCESS THEREOF

[75] Inventors: Tetsuya Tsunekawa; Masaaki Kotoura, both of Shiga; Kenji Tsunashima, Kyoto, all of Japan

[73] Assignee: Toray Industries, Inc., Japan

[21] Appl. No.: 09/028,314

[22] Filed: Feb. 24, 1998

[30] Foreign Application Priority Data

Feb. 26, 1997 [JP] Japan .................................. 9-042208
Apr. 21, 1997 [JP] Japan .................................. 9-103165

[51] Int. Cl.$^7$ .............................. C08L 67/02; B32B 27/36
[52] U.S. Cl. ........................ 525/444; 525/397; 428/338; 428/339; 428/480; 524/601
[58] Field of Search ..................... 428/480, 339; 525/397, 444

[56] References Cited

U.S. PATENT DOCUMENTS

| | | | |
|---|---|---|---|
| 4,728,698 | 3/1988 | Isayev et al. | 525/444 |
| 5,330,697 | 7/1994 | Wong | 264/171 |
| 5,825,543 | 10/1998 | Ouderkirk et al. | 359/494 |

Primary Examiner—Tae Yoon
Attorney, Agent, or Firm—Austin R. Miller

[57] ABSTRACT

A polyester film, comprising a non-liquid crystal polyester (A) and a copolyester (B) containing mesogen groups in the main chain to form a phase separated structure in the non-liquid crystal polyester (A), and the dispersed domains of the copolyester (B), having forms to satisfy the following formulae (1) and (2):

$$0.02 < (I/J) < 50 \quad (1)$$

$$K < 1/2 \times S[I, J] \quad (2)$$

where I, J and K are form indicators expressing the average form of the plurality of domains existing in the film: I is the average length of the dispersed domains of the copolyester (B) in the machine direction of the film; J, that in the transverse direction; and K, that in the normal direction: and S is a function for selecting the shorter value of the lengths I and J; if I>J, S[I, J] means J, and if I<J, S[I, J] means I. If the copolyester (B) has such geometrical forms, the polyester film obtained is excellent in rigidity, high toughness, heat shrinkage, clarity, surface properties, long-time thermostability, electric properties, etc. and small in oligomer content and thermal decomposition and gelation product content.

15 Claims, 2 Drawing Sheets

Note: The form indexes I, J and K and aspect ratios Qc and Qc are calculated by selecting 100 dispersed domains at random in each of the surface layer portion and the central layer portion.

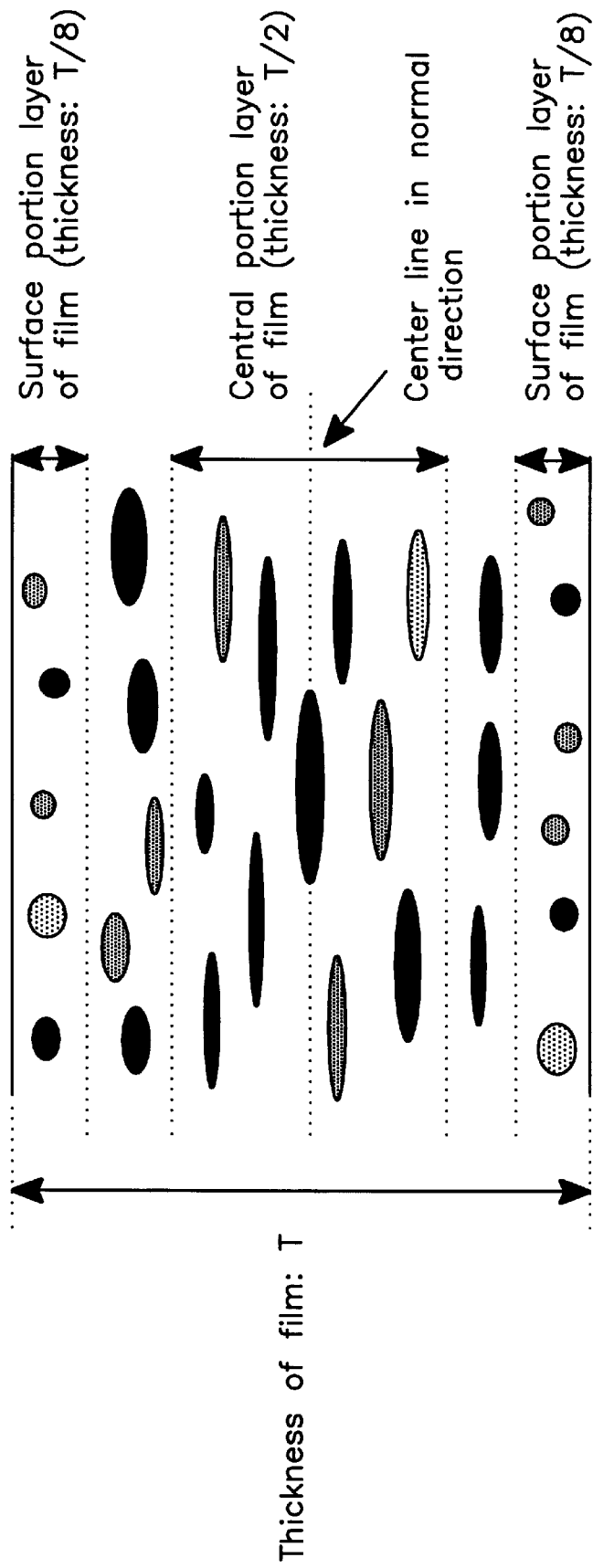

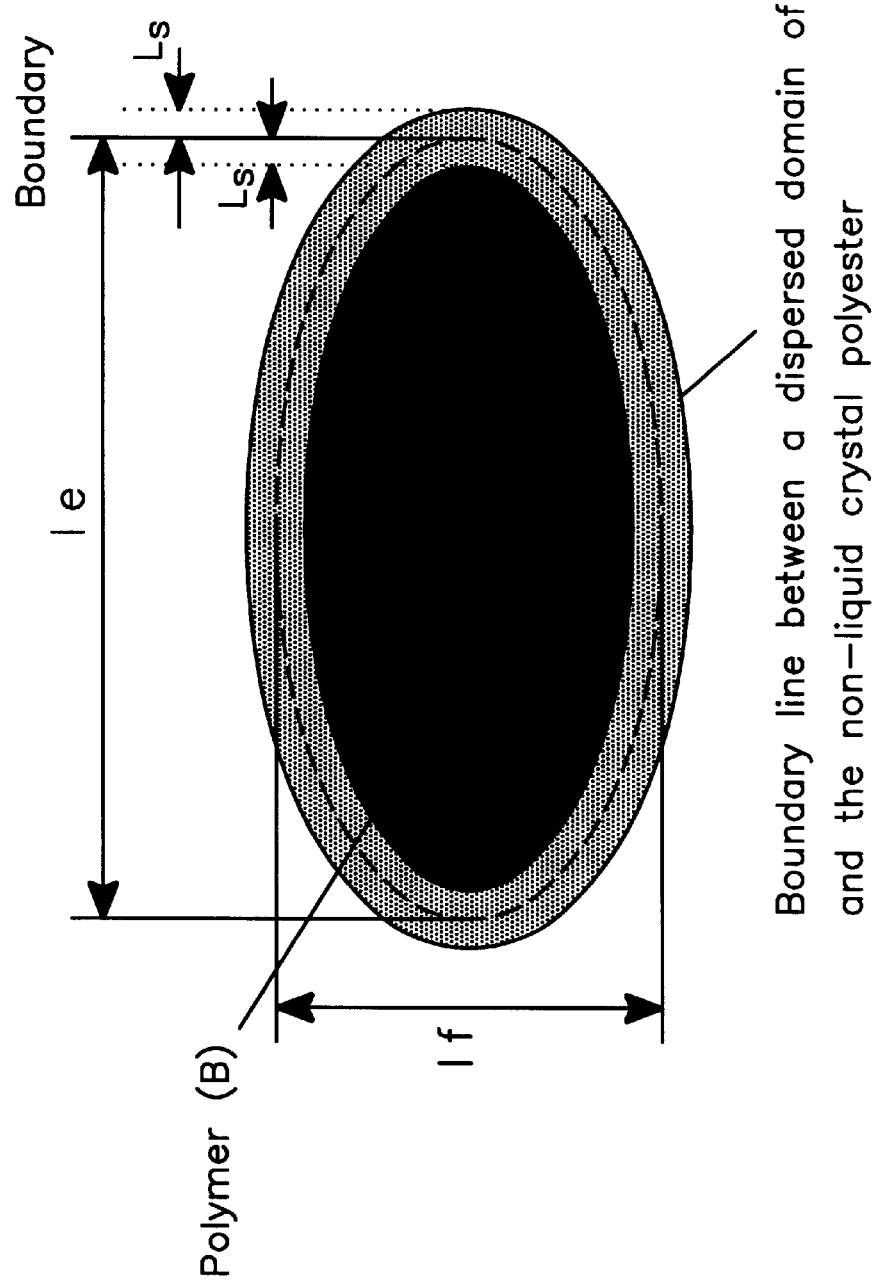

POLYESTER FILM AND A PRODUCTION PROCESS THEREOF

The present invention relates to a polyester film composed of a non-liquid crystal polyester and a copolyester containing mesogen groups in the main chain to form a phase separated structure in the non-liquid crystal polyester. The polyester film of the present invention is greatly improved in physical properties and quality compared to conventional polyester films. More concretely, the polyester film of the present invention is excellent in rigidity, high toughness, low heat shrinkability, clarity, surface properties (surface smoothness, surface slipperiness and abrasion resistance), long-time thermostability, electric properties, etc., low oligomer content, and thermal decomposition, and gelation product content. The present invention also relates to a production process thereof.

BACKGROUND ARTS

As methods for improving the quality and physical properties of polyester films, polymer blend techniques are actively examined in recent years. Especially studies concerning the blends consisting of a liquid crystal polyester and a non-liquid crystal polymer are actively conducted worldwide, and many inventions are disclosed as can be seen in U.S. Pat. No. 4,386,174, International Publication No. WO87-05919, U.S. Pat. No. 4,728,698, Japanese Patent Laid-Open (Kokai) No. 57-25354, Japanese Patent Laid-Open (Kokai) No. 5-169527, etc.

In general, since a liquid crystal polyester has a high Young's modulus, it can be finely dispersed in a polyester film, to reinforce the polyester film. As another utilization method, the high flowability of a liquid crystal polyester is used. Since a liquid crystal polyester has an effect to improve the flowability of a polymer, hence to control the shear heat generated in the extrusion process, blending it with a non-liquid crystal polyester is effective for decreasing the thermal decomposition and gelation product and oligomer in the film, for improving the quality of the polyester film.

It is reported in U.S. Pat. No. 4,728,698, etc. that if a liquid crystal polyester exists as spherical domains in a non-liquid crystal polyester, the Young's modulus cannot be enhanced, but that if a liquid crystal polyester exists as fibers, the Young's modulus can be enhanced remarkably. However, if a liquid crystal polyester exists as fibers in a film like this, there is a problem that it is difficult to enhance the Young's modulus in the direction perpendicular to the fiber-oriented direction, though the Young's modulus in the fiber-oriented direction can be enhanced. For example, in a conventional polyester film with fibrously dispersed domains, the liquid crystal polyester fibers are mostly oriented in the machine direction of the film, and in this case, though the Young's modulus in the machine direction of the film is remarkably enhanced, the Young's modulus in the transverse direction of the film is not enhanced. Furthermore, if the bonding at the interfaces between a non-liquid crystal polyester and a liquid crystal polyester is insufficient, excessive molecular orientation by stretching forms many voids, to degrade the clarity and to cause film breakage disadvantageously. A polyester film with a liquid crystal polyester dispersed in layers or sheets for improving the gas barrier property is disclosed in Japanese Patent Laid-Open (Kokai) No. 5-169527. The present inventors produced polyester films according to the method stated in the examples of the patent, and measured the Young's moduli of the obtained films, but could not obtain a high value as achieved in the present invention.

The general tendency in the formation of a polyester film that if the degree of molecular orientation is enhanced to improve the Young's modulus, the heat shrinkage increases when a liquid crystal polyester is blended.

If a blend obtained by adding a liquid crystal polyester to a non-liquid crystal polyester is formed into a film, the clarity of the film is degraded disadvantageously since the domain size of the liquid crystal polyester dispersed in the polyester film is as large as, or larger than the wavelengths (400 to 900 nm) of visible light. That is, if the domain size of the dispersed liquid crystal polyester is large, the film surface is heavily roughened irrespective of whether the domains are spherical, oblate, fibrous, needle-like or laminar. So, it is difficult to use the film as a base film for a magnetic tape, etc., and for this application, a polymer layer with a smooth surface must be laminated on a polyester film containing a liquid crystal polyester disadvantageously. The degradation of clarity and surface smoothness described above becomes more remarkable if the liquid crystal polyester content of the polyester film is increased for improving the Young's modulus and other quality.

The object of the present invention is to solve the above mentioned problems of the prior art, and to provide a high quality polyester film excellent in mechanical properties, low heat shrinkage, clarity, surface properties (surface smoothness, surface slipperiness and abrasion resistance), long-term thermostability and electric properties, less surface defects and low in oligomer content.

DISCLOSURE OF THE INVENTION

The inventors examined polyester films composed of a non-liquid crystal polyester (A) and a copolyester (B) with mesogen groups in the main chain to form a phase separated structure in the non-liquid crystal polyester (A), particularly in the relation between the forms of the dispersed domains of the copolyester (B) and the physical properties of the films, in an effort to find a method for improving the physical properties and quality of the polyester film by specifically controlling the forms of the dispersed domains. As a result, they found that if the dispersed domains of the copolyester (B) in the non-liquid crystal polyester (A) are controlled to have specific forms satisfying the following formulae (1) and (2); then (a) a film high in Young's modulus in both the machine and transverse directions of the film and low in heat shrinkability can be obtained and (b) the film obtained is improved in clarity and surface properties (surface smoothness, surface slipperiness and abrasion resistance).

$$0.02 < (I/J) < 50 \tag{1}$$

$$K < (\tfrac{1}{2}) \times S[I, J] \tag{2}$$

where I, J and K are form indicators to express the average form of the plurality of dispersed domains existing in the film: I is the average value of the largest lengths of the dispersed domains of the copolyester (B) in the machine direction; J is the average value of the largest lengths of the dispersed domains of the polyester (B) in the transverse direction; and K is the average value of the largest lengths of the dispersed domains of the polyester (B) in the normal direction: and S is a function for selecting the shorter value of lengths I and J. If I>J, S[I, J] is J, and if I<J, S[I, J] is I.

The inventors further examined polyester films composed of a non-liquid crystal polyester (A) and a copolyester (B) to form a phase separated structure in the non-liquid crystal polyester (A), particularly on the method for improving the physical properties and quality of the polyester film by controlling the forms of the dispersed domains of the copolyester (B) distributed in the normal direction of the film. As a result, they found that a film with more excellent performance can be obtained by keeping the aspect ratio L/D (=Qs) of the average major axis L to the average minor axis D of the dispersed domains of the copolyester (B) in the non-liquid crystal polyester (A) in the surface portion of the film, smaller than the L/D (=Qc) in the central layer of the film.

To control the dispersed domains of the copolyester (B) in the polyester film into geometrical forms satisfying the above formulae (1) and (2), a process for preparing a polyester film which includes an extrusion step of supplying a resin composition consisting of a non-liquid crystal polyester (A) and a copolyester (B) to form a phase separated structure when blended with the non-liquid crystal polyester, into an extruder, and discharging a molten polymer from a die, a casting step for cooling and solidifying the molten polymer, and forming into a sheet, a stretching step for stretching the formed sheet to 3 times or more in the machine direction and 3 times or more in the transverse direction, and a heat treatment step for heatsetting at a temperature of 150° C. to less than the melting point is effective, if any of the following conditions is adopted properly;

(a) Keeping the draw-down ratio at 3 to 50 and cooling rate at 150° C./sec or higher in the casting step (b) Holding up the resin composition for 15 to 60 minutes in the extrusion step (c) Using a die with a land length of 10 to 70 mm.

If all of the conditions (a) to (c) are adopted, the forms of the dispersed domains of the present invention can be more effectively obtained.

It is preferable to effect melt extrusion molding under any of the conditions (a), (b) and (c), and in this case, to keep the Qs smaller than the Qc, it is preferable to satisfy the following condition (d);

(d) Keeping the extrusion molding temperature at not lower than the crystallization initiation temperature in cooling of the non-liquid crystal polyester (A) and not higher than the melting point.

BRIEF DESCRIPTION OF THE DRAWINGS

FIG. 1 is a typical view representing a TEM photo showing a film section of the present invention, in which respective dispersed domains of the copolyester (B) are irregular in shade and form. The non-liquid crystal polyester (A) is expressed by the white portion in the figure, and the copolyester (B) corresponds to the phase separated dispersed domains.

FIG. 2 is a typical view showing a dispersed domain of the copolyester (B) appearing on a cut section in parallel to the film surface of the present invention, where the border with the non-liquid crystal polyester (A) has a width. In this drawing, Ls denotes the length of the half width of the border; le, the largest length of the dispersed domain in the machine direction of the film; and lf, the largest length of the dispersed domain in the transverse direction of the film.

MOST PREFERRED EMBODIMENTS OF THE INVENTION

Typical non-liquid crystal polyesters which can be used as the polyester (A) of the present invention include polyethylene terephthalate, polybutylene terephthalate, polyhexamethylene terephthalate, polyethylene naphthalate, polycyclohexanedimethylene terephthalate and their copolymers. Of course, those copolymerized with a polyester with an ether component in the main chain such as diethylene glycol, triethylene glycol, polyethylene glycol or polytetramethylene glycol can also be used. In the present invention, polyethylene terephthalate or polyethylene naphthalate with an inherent viscosity of 0.6 or more, preferably 0.8 or more, more preferably 1.0 or more is preferable. It is preferable that the inherent viscosity of the non-liquid crystal polyester (A) is higher, since the copolyester (B) to form a phase separated structure in the non-liquid crystal polyester is more likely to form domains with forms satisfying the formulae (1) and (2), and since the polyester film can be improved in Young's modulus and toughness. The most preferable means for obtaining a non-liquid crystal polyester (A) with a high inherent viscosity is solid phase polymerization. It is preferable that the melting point of the non-liquid crystal polyester (A) is not lower than that of the copolyester (B), since the copolyester (B) is likely to be finely dispersed in the forms satisfying the formulae (1) and (2).

Further reasons why it is preferable that the non-liquid crystal polyester (A) has a high inherent viscosity are that [1] since the copolyester (B) to form a phase separated structure in the non-liquid crystal polyester is likely to be finely dispersed to a size not larger than the wave lengths (400 to 900 nm) of visible light, it is easy to obtain a surface excellent in slipperiness and abrasion resistance, and that [2] since the L/D of the dispersed domains of the copolyester (B) is likely to be larger in the central portion than in the surface portion, the polyester film obtained is likely to be improved in Young's modulus and toughness. The most preferable means for obtaining such a non-liquid crystal polyester (A) with a high inherent viscosity is solid phase polymerization. It is also preferable that the melting point of the non-liquid crystal polyester (A) is not lower than that of the copolyester (B), since the L/D of the domains of the copolyester (B) dispersed in the non-liquid crystal polyester (A) is likely to be larger in the central portion than in the surface portion.

The copolyester (B) used in the present invention is melt moldable and forms a phase separated structure in the non-liquid crystal polyester (A). The copolyester can be any of an alternating copolymer, block copolymer, random copolymer and their mixtures.

If the copolyester forms dispersed domains with an average diameter of 1 µm or more, whether or not the dispersed domains are formed by a polymer can be judged by laser Raman analysis. If a dispersed domain has a peak of Raman band in a wave number range of 1600±10 cm$^{-1}$, it can be mostly judged that the dispersed domain is formed by a polymer with mesogen groups (liquid crystal structural component) in the main chain.

The copolyester (B) containing mesogen groups in the main chain in the present invention is a copolyester with structural components selected from aromatic hydroxycarbonyl components, aromatic dioxy components, aromatic dicarbonyl components, alkylenedioxy components, etc. Examples of the copolyester are enumerated in Japanese Patent Laid-Open (Kokai) No. 3-47861, etc. A preferable copolyester (B) is one or more selected from a copolyester composed of the following structural components (I), (II), (III) and (IV), a copolyester composed of the following structural components (I), (III) and (IV), and a copolyester composed of the following structural components (I), (II) and (IV).

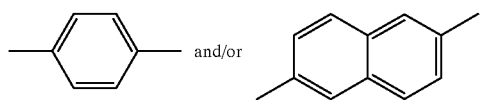 (I)

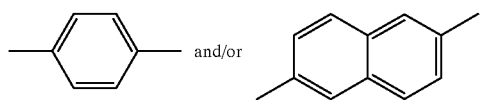 (II)

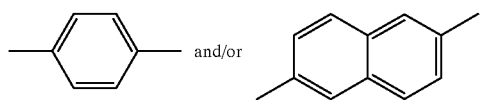 (III)

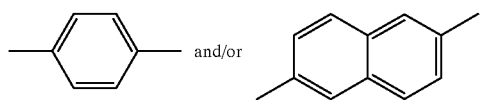 (IV)

(where R₁ stands for

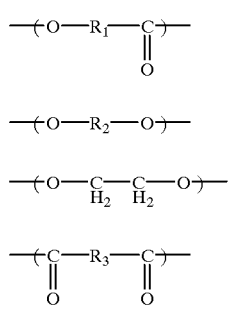

R₂ stands for one or more groups selected from

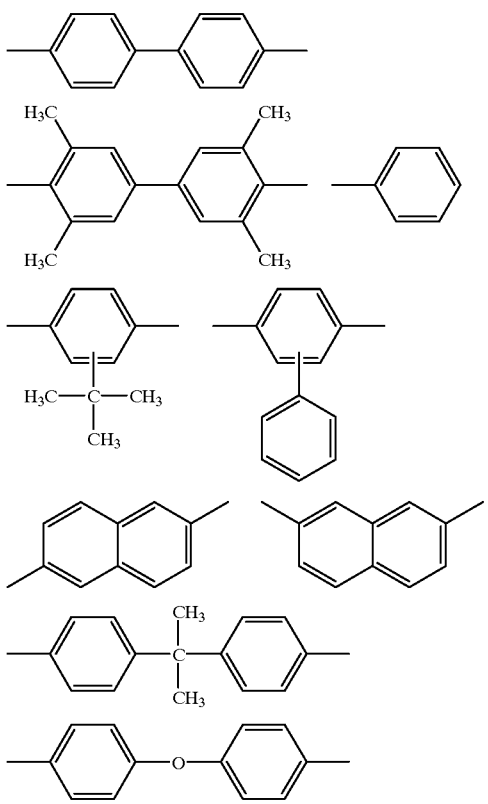

R₃ stands for one or more groups selected from

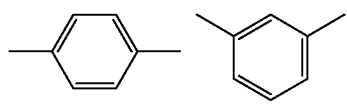

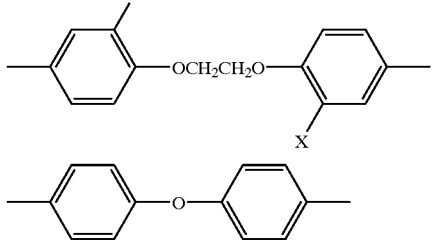

X stands for a hydrogen atom or chlorine atom; and the moles of structural components [(II)+(III)] are substantially equal to those of the structural component (IV).)

The above structural component (I) is a structural component of a polyester produced from p-hydroxybenzoic acid and/or 6-hydroxy-2-naphthoic acid. The structural component (II) is a structural component produced from an aromatic dihydroxy compound selected from 4,4'-dihydroxybiphenyl, 3,3',5,5'-tetramethyl-4,4'-dihydroxybiphenyl, hydroquione, t-butylhydroquinone, phenylhydroquinone, 2,6-dihydroxynaphthalene, 2,7-dihydroxynaphthalene, 2,2'-bis(4-hydroxyphenyl)propane and 4,4'-dihydroxydiphenyl ether. The structural component (III) is a structural component produced from ethylene glycol. The structural component (IV) is a structural component produced from an aromatic dicarboxylic acid selected from terephthalic acid, isophthalic acid, 4,4'-diphenylcarboxylic acid, 2,6-naphthalenedicarboxylic acid, 1,2-bis(phenoxy)ethane-4,4'-dicarboxylic acid, 1,2-bis(2-chlorophenoxy)ethane-4,4'-dicarboxylic acid and 4,4'-diphenylether dicarboxylic acid.

In the case of a copolyester composed of said structural components (I), (II) and (IV), it is preferable that R₁ stands for

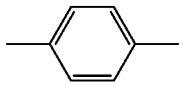

R₂ stands for one or more groups selected from

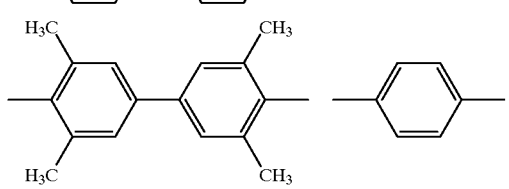

-continued

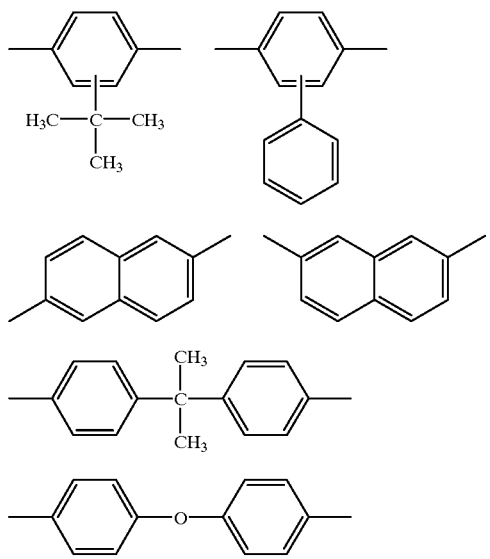

and $R_3$ stands for one or more groups selected from

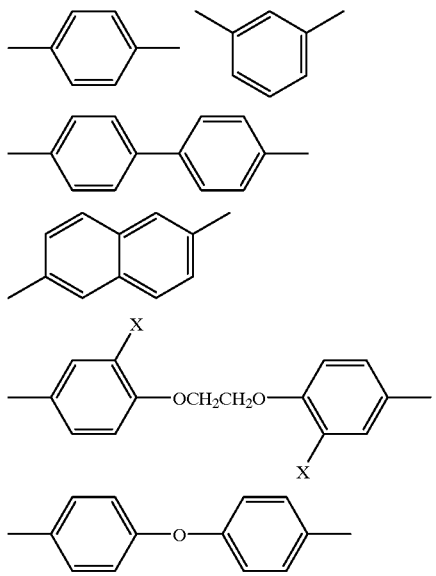

In the case of a copolyester composed of said structural components (I), (III) and (IV), it is especially preferable that $R_1$ stands for

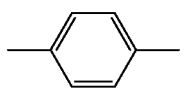

and $R_3$ stands for

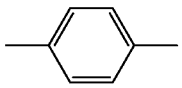

In the case of a copolyester composed of said structural components (I), (II), (III) and (IV), it is especially preferable that $R_1$ stands for

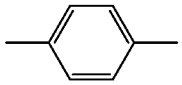

$R_2$ stands for

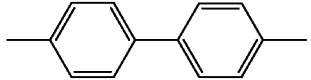

and $R_3$ stands for

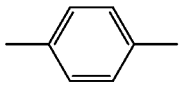

In the present invention, the copolymerized amount is calculated from the molar ratio of the structural units capable of forming the polymer, and expressed in mol %. In the case of said preferable copolyesters, the structural component (I), structural components (II)+(IV) and structural components (III)+(IV) are polymer-formable structural units, and the copolymerized amount can be calculated from the copolymerization molar ratio of the structural units. The copolymerization molar ratio of the structural units (I), (II)+(IV) and (III)+(IV) can be set as desired, but in view of the fine dispersibility in the non-liquid crystal polyester (A), the formation of dispersed domains with geometrical forms satisfying the formulae (1) and (2), and improvement of Young's modulus, it is preferable that the copolymerized amount of the mesogen groups of the copolyester (B) is 5 to 95 mol %. In view of improving the Young's modulus of the polyester film and inhibiting (or controlling) the shear heat generation in the extrusion step, it is preferable that the copolymerized amount of the structural units (I) and (II)+(III) as mesogen groups is 5 mol % or more.

On the other hand, in view of the dispersibility of the copolyester (B), the co-stretchability with the non-liquid crystal polyester (A) and the inhibition of void generation in the film, it is preferable that the copolymerized amount of (II)+(IV) is 95 mol % or less.

In the case of a copolyester composed of said structural components (I), (II), (III) and (IV), it is preferable that the molar fraction of the structural components [(I)+(II)] to the structural components [(I)+(II)+(III))] is 5 to 95 mol %. A more preferable range is 20 to 80%, and the most preferable range is 40 to 75 mol %. It is preferable that the molar fraction of the structural component (III) to the structural components [(I)+(II)+(III)] is 95 to 5 mol %. A more preferable range is 80 to 20 mol %, and the most preferable range is 60 to 25 mol %. It is preferable in view of flowability that the molar ratio of the structural components (I)/(II) is 75/25 to 95/5. A more preferable range is 78/22 to 93/7. The number of moles of the structural component (IV) is substantially equal to the total number of moles of the structural components [(II)+(III)].

In the case of a copolyester composed of said structural components (I), (III) and (IV), it is preferable that the molar fraction of the structural component (I) to the structural components [(I)+(III)] is 5 to 95 mol %. A more preferable range is 20 to 80 mol %, and the most preferable range is 40 to 75 mol %. The number of moles of the structural component (IV) is substantially equal to that of the structural component (III).

In the case of a copolyester composed of said structural components (I), (II) and (IV), it is preferable that the copolyester is used as a blend with a copolyester composed of the structural components (I), (II) and (III) and (IV) and/or a copolyester composed of the structural components (I), (III) and (IV), instead of being used alone. Also in this polymer blend, it is preferable that the molar fraction of the structural components [(I)+(II)] to the structural components [(I)+(II)+(III)] is 5 to 95 mol %. A more preferable range is 20 to 80%, and the most preferable range is 40 to 75 mol %.

In the above description, "substantially" means that either the number of carboxyl end groups or the number of hydroxyl end groups can be larger, as required. In this case, the number of moles of the structural component (IV) is not perfectly equal to the total number of moles of the structural components [(II)+(III)].

When any of the above preferable copolyesters is obtained by polycondensation, an aromatic dicarboxylic acid such as 3,3'-diphenyldicarboxylic acid or 2,2'-diphenyldicarboxylic acid, an aliphatic dicarboxylic acid such as adipic acid, azelaic acid, sebacic acid or dodecanedionoic acid, an alicyclic dicarboxylic acid such as hexahydroterephthalic acid, an aromatic diol such as chlorohydroquinone, methylhydroquinone, 4,4'-dihydroxydiphenylsulfone, 4,4'-dihydroxydiphenyl sulfide or 4,4'-dihydroxybenzophenone, an aliphatic or alicyclic diol such as 1,4-butanediol, 1,6-hexanediol, neopentyl glycol, 1,4-cyclohexanediol or 1,4-cyclohexanedimethanol, an aromatic hydroxycarboxylic acid such as m-hydroxybenzoic acid or 2,6-hydroxynaphthoic acid, p-aminophenol or p-aminobenzoic acid, etc. can be copolymerized in addition to the structural components (I) through (IV), to such a small extent that the object of the present invention is not impaired.

The method for producing the copolyester in the present invention is not especially limited, and any publicly known polycondensation method for producing polyesters can be used.

For example, when any of the above preferably used copolyesters does not contain the structural component (III), the following production method (1) or (2) is preferable, and if the copolyester contains the structural component (III), the following production method (3) is preferable.

(1) p-acetoxybenzoic acid, a diacylation product of an aromatic dihydroxy compound such as 4,4'-diacetoxybiphenyl or 4,4'-diacetoxybenzene, and an aromatic dicarboxylic acid such as terephthalic acid are used for acetic acid-removing polycondensation reaction, to produce the corresponding copolyester.

(2) An acetic anhydride is caused to react with p-hydroxybenzoic acid and an aromatic dihydroxy compound such as 4,4'-dihydroxybiphenyl or hydroquinone or an aromatic dicarboxylic acid such as terephthalic acid, to acylate the phenolic hydroxyl groups, and subsequently, acetic acid-removing polycondensation reaction is effected, to produce the corresponding copolyester.

(3) Method (1) or (2) is executed in the presence of a polymer or oligomer of a polyester such as polyethylene terephthalate or a bis($\beta$-hydroxyethyl) ester of an aromatic dicarboxylic acid such as bis($\beta$-hydroxyethyl)terephthalate, to produce the corresponding copolyester.

The above polycondensation reaction can take place even without any catalyst, but as the case may be, adding a metal compound such as stannous acetate, tetrabutyl titanate, potassium acetate, sodium acetate, antimony trioxide or metal magnesium is preferable.

In the present invention, it is preferable that the copolyester (B) is a polymer with a low viscosity which keeps the following melt viscosity ratio large. Melt viscosity ratio= Melt viscosity ($\eta$A) of non-liquid crystal polyester (A)/Melt viscosity ($\eta$B) of copolyester (B) to form a phase separated structure when blended with the non-liquid crystal polyester (A)

The reason is that the object of the present invention can be more effectively achieved when a copolyester (B) with a lower viscosity is added to a non-liquid crystal polyester (A). It is desirable that the melt viscosity ratio is at least 5 or more. Preferable is 10 or more, and more preferable is 50 or more. Especially preferable is 200 or more. The inventors found that a range of 200 to 100,000 is most preferable. Therefore, it is desirable that the melt viscosity of the copolyester (B) is less than about 100 Pa.second at a temperature 15 degree higher than the melting point of the non-liquid crystal polyester (A) forming the matrix at a shear rate of 100 second$^{-1}$, though depending on the melt viscosity of the non-liquid crystal polyester (A) used. Preferable is 10 Pa.second or less, and more preferable is 1 Pa.second or less. The copolyester (B) with such a low melt viscosity which can be especially suitably used for achieving the object of the present invention is a copolyester composed of said structural components (I), (II), (III) and (IV). This copolyester is especially effective for improving the quality of the polyester film, since it is likely to form domains with forms satisfying the formulae (1) and (2) in the non-liquid crystal polyester (A).

The amount of the copolyester (B) added is not especially limited, as far as the amount is proper to achieve the object of the present invention, but is usually 0.01 to 40 wt % based on the weight of the entire polymer. A preferable range is 0.05 to 20 wt %, and a more preferable range is 0.1 to 5 wt %.

It is essential that the dispersed domains of the copolyester (B) of the present invention have geometrical forms satisfying the following formulae (1) and (2).

$$0.02 < (I/J) < 50 \qquad (1)$$

$$K < (\tfrac{1}{2}) \times S[I, J] \qquad (2)$$

where I, J and K are form indicators calculated as average values from the plurality of dispersed domains existing in the film: I is the average value of the largest lengths of the dispersed domains of the copolyester (B) in the machine direction of the film; J is the average value of the largest lengths of the dispersed domains of the polyester (B) in the transverse direction; and K is the average value of the largest lengths of the dispersed domains of the polyester (B) in the normal direction: and S is a function for selecting the shorter value of lengths I and J. If I>J, then S[I, J] is J, and if I<J, then S[I, J] is J. I, J and K are obtained by measuring the respective lengths of 100 dispersed domains using a transmission electron microscope, and calculating the respective average values as described later. In the present invention, some spherical, fibrous, needle-like and laminar domains are allowed to exist together.

In the present invention, the forms of the dispersed domains existing in the film are defined as follows:

Spherical domain: I=J=K. This domain satisfies the formula (1), but does not satisfy the formula (2).

Oblate domain: I/J is ⅓ to less than 3. This domain does not satisfy the formula (2).

Fibrous domain: I/J is less than ⅓ or 3 or more. This domain does satisfy either the formula (1) or (2).

Laminar domain: This domain satisfies the formula (2), but does not satisfy the formula (1).

In the present invention, if the dispersed domains of the copolyester (B) do not satisfy either the formula (1) or (2), the effect of the present invention cannot be obtained. It is unpreferable that I/J is less than 0.02 or more than 50, since it is difficult to enhance the Young's modulus in the direction perpendicular to the direction in which the dispersed domains of the polymer (B) are oriented, and since the heat shrinkage is likely to be large. It is preferable that the I/J ratio is 0.04 to 25. A more preferable range is 0.1 to 10.0, and the most preferable range is 0.2 to 5.0. If the value of (I/J) is in the preferable range of the present invention, it is easier to obtain a high quality polyester film high in Young's modulus in both the machine direction (MD direction) and the transverse direction (TD direction) and small in heat shrinkage.

In the present invention, it is preferable that K is 0.001 to 10.0 μm to obtain a film higher in Young's modulus and lower in heat shrinkage. It is very difficult to keep K at less than 0.001 μm, and this is practically essentially not required. A more preferable range of K is 0.01 to 1.0 μm, and an especially preferable range is 0.03 to 0.3 μm. A preferable range of I or J value is 0.05 to 30 μm, and a more preferable range is 0.1 to 10 μm. The most preferable range is 0.2 to 1 μm. The inventors found that it is preferable that I and J are 30 μm or less, for such reasons that it is easier to let the dispersed domains of the copolyester (B) satisfy the formulae (1) and (2), that the separation at the interfaces between the non-liquid crystal polyester (A) and the copolyester (B) in the film does not occur, and that voids are less likely to be formed. It is practically very difficult to keep I or J at less than 0.05 μm.

The surface portion of a film in the present invention refers to the portion of T/8 from either of the film surfaces in a polyester film with thickness T as shown in FIG. 1, and the central portion of the film refers to the central portion of T/2 in thickness. To secure a high Young's modulus as well as surface slipperiness and abrasion resistance, it is preferable that the ratio of the aspect ratio L/D of dispersed domains of the polymer (B) in the central portion to that in the surface layer (Qc/Qs) is 2 to 300. A more preferable range is 5 to 150, and the most preferable range is 10 to 100.

The L/D of the dispersed domains of the copolyester (B) is judged from the structure of the film as a whole, and it is a geometrical indicator showing the average form of the dispersed domains of the copolyester contained in the surface or central portion of the film. The average major axis L and the average minor axis D in the present invention can be obtained from the following formulae (3) and (4).

$$L = \max[I, J, K] \quad (3)$$

$$D = (I+J+K-L)/2 \quad (4)$$

The max[I, J, K] is a function for selecting the largest value of I, J and K lengths.

In the present invention, it is preferable that the aspect ratio Qs of the dispersed domains of the copolyester (B) in the surface layer of the film is 1 to 20. A more preferable range is 1 to 10, and the most preferable range is 1 to 3. Furthermore, it is preferable that the average major axis L of the dispersed domains of the copolyester (B) in the surface portion of the film is 0.01 to 3 μm. A more preferable range is 0.01 to 1.0 μm, and the most preferable range is 0.02 to 0.5 μm. In view of film surface properties, it is preferable that the aspect ratio Qs in the surface portion of the film is 20 or less, and that the average major axis L of the dispersed domains is 3 μm or less.

The sum of the Young's modulus in the machine direction (YMD) and the Young's modulus in the transverse direction (YTD), i.e., the total Young's modulus of the film of the present invention is mostly 8 to 30 GPa, though depending on the stiffness and amount of the non-liquid crystal polyester (A) and the copolyester (B). In view of the practicality of the film, it is preferable that the total Young's modulus is 8 GPa or more, and in view of low heat shrinkage, 30 GPa or less is preferable. A more preferable total Young's modulus range is 10 to 25 GPa, and an especially preferable range is 12 to 20 GPa. The difference between YMD and YTD of the polyester film obtained in the present invention is mostly 0 to 3.5 GPa. If the forms of the domains of the copolyester (B) are controlled in the preferable range disclosed in the present invention, it is easy to obtain a film of 0 to 2 GPa in the difference between YMD and YTD. The heat shrinkage of the film depends on the stretching and heat treatment conditions, but in the film obtained in the present invention, the sum of the heat shrinkage at 100° C. for 30 minutes in the machine direction and that in the transverse direction is substantially 3% or less. A more preferable range of the sum of heat shrinkages is 2% or less, and a further more preferable range is 1% or less. As disclosed in the present invention, if the dispersed domains of the copolyester (B) satisfy the formulae (1) and (2), it is easy to enhance the Young's modulus in the machine and transverse directions without increasing the heat shrinkage in the machine and transverse directions.

The haze of the film in the present invention refers to the internal haze (%) in terms of 25 μm measured by immersing a film specimen in tetralin. According to the present invention, the internal haze in terms of 25 μm can be lowered. If the dispersed domains of the copolyester (B) are finely dispersed to have forms satisfying the formulae (1) and (2), it is easy to obtain a polyester film excellent in clarity with a haze of 0.1 to 10%. The inventors found that it is industrially very difficult to keep the haze at less than 0.1%, and this is practically essentially not required in the case of polyester film. To produce a clear polyester film, a more preferable haze range is 0.1 to 3%, and a more preferable range is 0.1 to 1%. The clarity of the film is also affected by the screw used for melt extrusion. In the present invention, the screw can be of any form such as full flight screw or barrier flight screw, etc. However, to promote the fine dispersion of the copolyester (B), for lowering the haze of the film, it is preferable to use any of various mixing type screws of 20 or more in the ratio of the length to diameter of the screw. A mixing type screw refers to a screw with a mixing zone at the compression zone or metering zone or at a position between them, for example, fluted barrier screw, Dulmage screw, Unimelt screw, multiple pin screw, etc.

Moreover, if the copolyester (B) exists as domains with forms satisfying the formulae (1) and (2) in the polyester film, the surface smoothness of the film can be improved. In the present invention, it is preferable that the surface roughness Ra of the film is 0.5 to 100 nm. A more preferable range is 1 to 30 nm. It is preferable that the amount of the copolyester (B) is 0.1 to 5 wt %, and that the copolyester (B) is finely dispersed to have an average domain diameter of less than 1 μm with the forms satisfying the formulae (1) and (2), since it is easy to obtain a film with a surface roughness Ra of 1 to 10 nm essentially required as a base film for a magnetic tape, particularly a metal evaporated tape. In view of the slipperiness of the film and avoiding troubles in the step of film winding, it is preferable that the surface roughness Ra is 0.5 nm or more. On the other hand, in view of preventing problems involved in various applications of the film, it is preferable that the surface roughness Ra is 100 nm or less.

It is preferable that the coefficient of dynamic friction (μk) of the polyester film of the present invention is 0.3 or less in view of the abrasion resistance and slipperiness of the film. More preferable is 0.27 or less.

Furthermore, if the copolyester (B) exists as domains with forms satisfying the formulae (1) and (2) in the polyester film, the long-time thermostability of the film can be improved.

In the present invention, the non-liquid crystal polyester oligomer content in the polyester film can be decreased to 1 wt % or less, to improve the film quality and to decrease problems in process control.

The polyester film of the present invention can contain a compatibilizing agent between the non-liquid crystal polyester (A) and the copolyester (B), plasticizer, weather resisting agent, antioxidant, thermostabilizer, lubricant, antistatic agent, brightening agent, colorant, conductive material, etc. in addition to the non-liquid crystal polyester (A) and the copolyester (B), as far as the effect of the present invention is not inhibited. It is preferable that the average refractive index of the compatibilizing agent has an intermediate value between those of the non-liquid crystal polyester (A) and the copolyester (B), for better mechanical properties and clarity of the polyester film.

The polyester film of the present invention can also be a mono-layer film, but can also be laminated with another polymer layer of, for example, a polyester, polystyrene, polyolefin, polyamide, polyvinylidene chloride or acrylic polymer, etc. Especially when a polyester layer is thinly laminated on the surface layer, keeping the thickness (M) of the laminated layer smaller than the average size (N) of the particles contained in the laminated layer (M<N) can provide a film excellent in running property, slipperiness and smoothness, and this is preferable for a base film used for magnetic recording in which surface properties are important. It is preferable that N is 1/1000 to 1/2 of M. A more preferable range is 1/100 to 1/10. Especially a laminated film consisting of three or more polyester layers is effective for improving the quality as a film for magnetic recording, since the two surface layers can be individually controlled in surface smoothness. Furthermore, if a laminated film consisting of three or more layers has a recovered raw material, etc. mixed in the central layer, productivity can also be improved. The particles can be of, though not limited to, silicon oxide, magnesium oxide, calcium carbonate, titanium oxide, aluminum oxide, crosslinked polyester, crosslinked polystyrene, mica, talc, kaolin, etc. However, in the case of the film of the present invention, since the copolyester (B) forms fine protrusions on the surface as stated in the examples described later, though depending on the kind, composition and amount of the copolyester (B) and the melt extrusion conditions, the particles are not required in most cases.

It is preferable that the polyester film of the present invention is an oriented film obtained by monoaxially or biaxially stretching and heatsetting by publicly known methods. This can remarkably improve the elastic modulus, high toughness, dimensional stability, clarity, surface properties, long-time thermostability, electric properties, etc. of the film, which are required for various applications such as magnetic recording, electric insulation, heat sensitive transfer ribbons, heat sensitive stencil printing, packaging, etc.

The thickness of the film considered in the present invention is 0.5 to 300 μm. A preferable thickness range is 1 to 100 μm, and a more preferable range is 2 to 30 μm. Especially for magnetic tape, a range of 2 to 10 μm is preferable.

The forms of the dispersed domains of the copolyester (B) considerably depend on production conditions, though also depend on the kind of the polymer used. In the present invention, the forms of the dispersed domains can be effectively obtained by properly adopting the following conditions;

(a) Keeping the draw-down ratio at 3 to 50 and cooling rate at 150° C./sec or higher in the casting step (b) Holding up the resin composition for 15 to 60 minutes in the extrusion step (c) Using a die with a land length of 10 to 70 mm.

It is preferable that the draw-down ratio for extrusion from a T die into a sheet is 5 to 30, and a more preferable range is 7 to 20. It is preferable that the cooling rate of the polymer is 300° C./sec or more. The cooling rate in this case refers to the average cooling rate for cooling from the polymer temperature in the die to 100° C. The cooling rate can be adjusted by any of various methods such as directly cooling the film by air or water.

The holdup of the resin composition in the extrusion step refers to the time taken after supplying the polymer into the extruder until the polymer bleeds from the die. A preferable holdup is 20 to 50 minutes, and a more preferable is 25 to 40 minutes. In view of the forms of the dispersed domains of the copolyester (B), a preferable holdup is 15 minutes or more, and in view of maintaining the molecular weight of the non-liquid crystal polyester (A), a preferable holdup is 60 minutes or less. It is preferable that the ester exchange rate of the copolyester (B), i.e., the percentage of the weight of the ester exchanged copolyester (B) to the total weight of the copolyester (B) is 5 to 20%. A more preferable ester exchange rate is 7 to 15%.

It is more preferable that the land length of the die used in the extrusion step is 15 to 50 mm, and a further more preferable range is 20 to 40 mm. In view of the dispersed domains of the copolyester (B), it is preferable that the land length of the die is 10 mm or more. Furthermore, in view of higher film quality to be achieved by thickness adjustment and the decrease of breaking of thin film, it is preferable that the land length of the die is 70 mm or less.

To keep the Qs of the dispersed domains of the copolyester (B) smaller than Qc, it is preferable to mold the resin composition composed of the non-liquid crystal polyester (A) and the copolyester (B) by melt extrusion under any of the above conditions (a), (b) and (c), and it is more preferable to satisfy the following condition (d). It is preferable to stretch at a ratio of 3 to 10 times in the machine direction and at a ratio of 3 to 10 times in the transverse direction after completion of melt extrusion molding, and then to heatset at a temperature of 150° C. to lower than the melting point of the non-liquid crystal polyester (A).

(d) Keeping the extrusion molding temperature at not lower than the crystallization initiation temperature in cooling of the non-liquid crystal polyester (A) and not higher than the melting point.

It is more preferable that the extrusion molding temperature is the (crystallization initiation temperature during cooling +2° C.) to the (melting point –2° C.) of the non-liquid crystal polyester (A). A further more preferable range is (crystallization initiation temperature during cooling +5° C.) to (melting point –5° C.). For obtaining a film with Qs smaller than Qc, it is preferable that the melt molding temperature is not higher than the melting point of the non-liquid crystal polyester (A), and for avoiding the troubles caused by the solidification of the polymer, it is preferable that the melt molding temperature is not lower than the crystallization initiation temperature during cooling of the non-liquid crystal polyester (A). The extrusion molding temperature in the present invention refers to the polymer temperature at the center in the T die.

An example of the method for producing the polyester film of the present invention is described below, but the present invention is not limited thereto or thereby.

In this example, polyethylene terephthalate is used as the non-liquid crystal polyester (A), and a copolyester consisting of 60 mol % of p-hydroxybenzoic acid and 40 mol % of polyethylene terephthalate is used as the copolyester (B) to form a phase separated structure with the non-liquid crystal polyester (A). The production conditions depend on the polyesters used. According to a conventional method, terephthalic acid and ethylene glycol are esterified, or dimethyl terephthalate and ethylene glycol are esterexchanged, to obtain bis-β-hydroxyethyl terephthalate (BHT). Then, while BHT is transferred to a polymerization reactor, it is heated to 280° C. in vacuum for polymerization reaction, to obtain a polyester with an inherent viscosity of about 0.5. The obtained polyester as pellets are polymerized in solid phase under reduced pressure. For solid phase polymerization, the polyester is preliminarily crystallized at a temperature of 180° C. or lower, and solid phase polymerization is effected at 190 to 250° C. at a reduced pressure of about 1 mm Hg for 10 to 50 hours, to raise the polymerization degree so that the melt viscosity may become 5 times or more that of the copolyester(B) used.

A raw material obtained by blending the polyethylene terephthalate and the copolyester (B) with a high viscosity, or a master raw material obtained by once melting and homogeneously mixing them, or a raw material recovered from the film of the present invention, or a raw material obtained by mixing the above two or three raw materials properly, is dried at 180° C. for 3 hours or more in vacuum, and supplied to a single-screw extruder or double-screw extruder heated to 280° C., in a nitrogen stream or vacuum to avoid the decline of inherent viscosity, for forming a film according to a publicly known method. In this case, it is preferable that the screw shear rate (=ΠDN/h, D: diameter of screw, N: rotating speed of screw, h: groove depth of metering zone of screw) of the extruder is 20 second$^{-1}$ or more. A more preferable screw shear rate is 50 second$^{-1}$ or more, but in view of prevention of thermal decomposition and gelation of the polymer by shear heat generation and the inhibition of oligomer content increase, a shear rate of less than 300 second$^{-1}$ is preferable. It is preferable to set the holdup, cooling rate and draw-down ratio of the polymer extruded from a T die into a sheet in said preferable ranges and to use a die with a land length of 10 mm or more for molding, since the dispersed domains of the copolyester (B) are likely to have desired forms. Furthermore, to remove foreign matter in melt extrusion, it is preferable to use a publicly known filter made of, for example, sintered metal, porous ceramic, sand or wire gauze, etc. In this case, the shear rate during passage through the filter is as low as 10 second$^{-1}$ or less. If a non-liquid crystal polyester (A) with a high inherent viscosity is filtered alone, the filtration pressure is high, but if a preferable copolyester (B) is added, it is easy to lower the filtration pressure into a practical range.

Subsequently, the cast film is heated by a group of heating rolls of 80 to 180° C., stretched in one or more stages to 2~7 times in the machine direction, and cooled by a group of cooling rolls of 20 to 50° C. Then, the film is introduced into a publicly known tenter, and with both the ends of the film clipped, it is heated in a hot air atmosphere at 80~180° C., and stretched in one or more stages to 2~7 times in the transverse direction. In this case, it is preferable that the difference between the stretching ratio in the machine direction and that in the transverse direction is less than 3 times, and more preferable is less than 2 times. The stretching of the film in the machine direction can precede or follow that in the transverse direction, or simultaneous biaxial stretching can also be effected. In succession, the film is heatset at a temperature of 150° C. to lower than the melting point. The heatsetting can be effected under tension or while being stretched in the machine direction to 1.05~1.5 times, or furthermore, to improve the thermal dimensional stability, it is also preferable to relax in the machine direction and/or in the transverse direction of the film. As required, before heatsetting, it is also preferable to re-stretch in the machine direction and/or in the transverse direction, since the film of the present invention can be reinforced.

[Methods for Measuring Physical Properties and Methods for Evaluating Effects]

(1) Inherent Viscosity

Measured according to the method stated in ASTM D 1601.

(2) Melt viscosity

The value at 280° C. at a shear rate of 100 second $^{-1}$ was measured using a Koka type flow tester and expressed in [Pa.second].

(3) Haze

The internal haze (%) of the polyester film was measured according to the method stated in ASTM D 1003-61, and the internal haze (%) in terms of 25 µm was calculated from the following formula:

Haze=Internal haze (%) of film×(25 (µm)/thickness of film (µm))

(4) Melting Point and Cooling Crystallization Initiation Temperature

Measured using DSC (differential scanning calorimeter) Model II produced by Perkin Elmer. Ten milligrams of a sample was set in the DSC, molten at 300° C. for 5 minutes, and quickly cooled in liquid nitrogen. The sample was heated at a rate of 10+ C./min, to detect the glass transition point and cold crystallization temperature, and further kept heated, to identify the heat absorption peak temperature based on crystal melting as melting point Tm. Furthermore, from a molten state of 300° C., it was cooled at a rate of 10° C./min, and the temperature at which crystallization began with heat generation was identified as the cooling crystallization initiation temperature Tmcs, and the crystallization heat generation peak temperature as the cooling crystallization temperature Tmc.

(5) Young's Modulus

Measured according to the method stated in JIS Z 1702.

(6) Heat Shrinkage

Measured according to the method stated in JIS C 2318.

(7) Surface Roughness Ra

Measured according to the method stated in JIS B 0601.

(8) Abrasion Resistance

A tape with a width of ½ inch obtained by slitting a film was run on a stainless steel guide pin (100 nm in surface roughness Ra) using a tape running tester (running speed 250 m/min, wrapping angle 60°, outlet side tension 90 g, running time once). The number of flaws formed in the film was observed by a microscope for judgment according to the following criterion:

Less than two flaws with a width of 2.5 µm or more per tape
width . . . Excellent
Less than ten flaws . . . Good
Ten or more flaws . . . Poor It is desirable that the abrasion resistance is excellent, but good abrasion resistance also allows practical application.

(9) Coefficient of Dynamic Friction µk

When the abrasion resistance of (8) was measured, the initial µk as the coefficient of dynamic friction was obtained from the following formula:

$$\mu k = 2.20 \log(90/T)$$

where T is the inlet side tension. It was judged that when the µk value was 0.30 or less, slipperiness was good and when more than 30, the slipperiness was poor. A µk value of 0.30 is a critical point at which any trouble due to poor slipperiness may or may not occur in processing such as printing.

(10) Form Indicators I, J and K, Average Major Axis L, Average Minor Axis D and Aspect Ratios Qs and Qc of Dispersed Domains of Copolyester (B)

A polyester film was cut (1) in the direction parallel to the machine direction and perpendicular to the film surface, (2) in the direction parallel to the transverse direction and perpendicular to the film surface, and (3) in the direction parallel to the film surface. The cut faces were observed by a transmission electron microscope (TEM). The maximum lengths (1$a$) of the domains of the copolyester (B) appearing in the cut face of (1) in the normal direction of the film and the maximum lengths (1$b$) of the same domains in the machine direction, the maximum lengths (1$c$) of the domains of the copolyester (B) appearing in the cut face of (2) in the normal direction of the film and the maximum lengths (1$d$) of the same domains in the transverse direction, and the maximum lengths (1$e$) of the domains of the copolyester (B) appearing in the cut face of (3) in the machine direction and the maximum lengths (1$f$) of the same domains in the transverse direction were observed by direct observation or from a microscopic photo randomly.

These lengths 1$a$, 1$b$, 1$c$, 1$d$, 1$e$ and 1$f$ were obtained from 100 dispersed domains selected at random in each cut face. The boundary between a domain forming a phase separated structure and the non-liquid crystal polyester (A) was judged in reference to the shade difference of the TEM image, and when the boundary portion was observed to have a width, the position at the center of two points respectively judged to be the non-liquid crystal polymer (A) and the copolyester (B) was identified as the boundary (FIG. 2). When a shade difference was observed due to a microphase separated structure, etc. also inside a domain of the copolyester (B), the entire contour of the copolyester (B) to the non-liquid crystal polyester(A) was decided as the boundary.

The form indicators I, J and K of the dispersed domains of the copolyester (B) were obtained as follows. I was defined as (average value of 1$b$ values+average value of 1$e$ values)/2; J, as (average value of 1$d$ values+average value of if values)/2; and K, as (average value of 1$a$ values+average value of 1$c$ values)/2. The average major axis L and the average minor axis D were decided from the above I, J and K and said formulae (3) and (4), and the ratio L/D was defined as aspect ratio. For the ratio of the aspect ratio Qc in the central portion to the aspect ratio Qs in the surface portion, i.e., Qc/Qs, is determined as follows;

(1) I,J,K,L,D were values obtained for the central portion and the two surface portions of both sides of film, respectively.

(2) The L/D values of the two surface portions were compared and the smaller L/D was adopted as Qs. (3) Qc/Qs calculated from the aspect ratio(=Qc) for central portion and said Qs adopted.

Whether or not dispersed domains are a polymer was judged by comparing the form indicators of the dispersed domains of the film with those of the cast film obtained by melt-extruding the film again. In the present invention, when at least one of the form indicators changed by 10% or more, the dispersed domains were judged to be a polymer.

(11) Holdup of Polymer During Melt Extrusion

One weight percent of carbon black was added to the supply zone of the extruder as a tracer, and how the tracer was discharged from the tip of the T die through the extruder, short tube and filter was observed. With the time when the tracer was supplied to the supplying zone of the extruder as $t_1$ and with the time when the carbon black discharged from the die disappeared as $t_2$, $(t_2-t_1)$ was defined as the holdup time (min). Whether or not the carbon black disappeared was judged by measuring the total light transmittance at the center of the cast film. The time when the following function F became 0.98 was defined as $t_2$.

F=(Total light transmittance of cast film after supply of carbon black)/(Total light transmittance of cast film before supply of carbon black)

The total light transmittance was measured by using spectrophotometer U-3410 produced by Hitachi, Ltd., and the value with a wavelength of 550 nm was adopted.

(12) Cooling Rate of Polymer During Casting

A thermocouple was inserted at the center of the outlet of the T die, to measure the temperature (T0) of the molten polymer. Then, the temperature of the cooled and solidified cast film was measured by a surface thermometer, and a position (P) of 100° C. was decided. The time t taken after the molten polymer was discharged from the die until it reached the position P was calculated, and the cooling rate (° C./sec) was obtained from the following formula:

$$\text{Cooling rate of polymer} = (T_0 - 100)/t$$

(13) Long-time Thermostability (Time Taken for the Elongation at Break to be Halved)

Before long-time thermostability measurement, the film was cut in the machine or transverse direction, and the elongation at break was obtained by a tensile tester of a Tensilon type. The film was heat-treated in a hot oven in an atmosphere of 190° C., and the time taken for the elongation at break to be reduced to ½ of the initial elongation at break was obtained.

EXAMPLES

The present invention is described below concretely based on examples and comparative examples.

Example 1

(Tables 1 and 2)

Particle-free polyethylene terephthalate with an inherent viscosity of 0.63 (dl/g) was used as the non-liquid crystal polyester (A). A copolyester $B_1$ (melting point 250° C., liquid crystal initiation temperature 215° C., melt viscosity 10 Pa.sec) obtained by polycondensing the following raw materials was used as the copolyester (B).

| [Raw materials of copolyester B₁] | |
|---|---|
| | Molar ratio for copolymerization |
| Hydroxybenzoic acid | 72.5 |
| 4,4'-dihydroxybiphenyl | 7.5 |
| Ethylene glycol | 20.0 |
| Terephthalic acid | 27.5 |

A mixture consisting of 80.0 wt % of the polyethylene terephthalate and 20.0 wt % of the copolyester $B_1$ were dried, supplied into a 150 mm single-screw extruder with a barrier flight screw of 28 in the ratio of the length to diameter of the shaft, melt-mixed and metered at 285° C. at a screw shear rate of 100 second$^{-1}$, fed through a fiber sintered stainless steel filter (10 μm cut) at a shear rate of 10 second$^{-1}$ and extrusion-molded from a T die with a land length of 10 mm at a draw-down ratio of 8 into a sheet, and the sheet was brought into contact with a cooling drum kept at 25° C. while electrostatic charges were applied, to be cooled and solidified. In this case, the film was cooled in an air chamber, to keep the polymer cooling rate at 300° C./sec. The holdup of the polymer was 15 minutes. The cast film was stretched to 4 times at 95° C. in the machine direction by a roll type stretching machine, introduced into a tenter, stretched to 4 times at 95° C., once cooled to 60° C., and heatset at 245° C., to obtain a 25 μm thick biaxially oriented film. The production conditions are shown in Table 1.

The properties obtained are shown in Table 2. In the film, the dispersed domains of the copolyester were finely dispersed to have forms satisfying the formulae (1) and (2). Thus, a high quality polyester film high in Young's modulus and low in heat shrinkage could be obtained.

Examples 2 to 6 and Comparative Examples 1 to 4 (Tables 1 and 2)

Polyester films with a thickness of 25 μm were obtained as described in Example 1, except that the inherent viscosity of polyethylene terephthalate (PET), the melt viscosity and amount of the copolyester $B_1$ and casting conditions were changed. The production conditions are shown in Table 1. In Examples 2 and 3 where PET with an inherent viscosity of 1.0 or 1.4 was used, the stretching ratios in the machine and transverse directions were set to be 4.5 times, respectively. When the dispersed domains of the copolyester $B_1$ had geometrical forms satisfying the formulae (1) and (2), high quality polyester films high in Young's modulus and low in heat shrinkage could be obtained as in Example 1 (Examples 2 to 6).

On the other hand, when the dispersed domains of the copolyester $B_1$ had laminar (Comparative Example 1) or fibrous (Comparative Example 2) forms not satisfying the formula (1) or (2) by changing the casting conditions as shown in Table 1, the heat shrinkage in the transverse direction became large, and the Young's modulus in the transverse direction could not be enhanced. Furthermore, when the dispersed domains of the copolyester $B_1$ were spherical, the Young's modulus could not be enhanced in either the machine direction or the transverse direction, and heat shrinkage was also high (Comparative Examples 3 and 4).

TABLE 1

| | Inherent viscosity of PET pellets | Copolyester (B) | | | Cooling rate during casting [° C./sec] | Draw-down ratio during casting |
|---|---|---|---|---|---|---|
| | | Kind of polymer | Melt viscosity [Pa · sec] | Amount (wt %) | | |
| Example 1 | 0.63 | $B_1$ | 10 | 20.0 | 300 | 8 |
| Example 2 | 1.00 | $B_1$ | 10 | 20.0 | 300 | 8 |
| Example 3 | 1.40 | $B_1$ | 10 | 20.0 | 300 | 8 |
| Example 4 | 0.63 | $B_1$ | 1 | 20.0 | 300 | 8 |
| Example 5 | 0.63 | $B_1$ | 10 | 10.0 | 300 | 10 |
| Example 6 | 0.63 | $B_1$ | 10 | 20.0 | 500 | 15 |
| Comparative Example 1 | 0.63 | $B_1$ | 10 | 20.0 | 500 | 60 |
| Comparative Example 2 | 0.63 | $B_1$ | 10 | 20.0 | 300 | 70 |
| Comparative Example 3 | 0.63 | $B_1$ | 10 | 20.0 | 100 | 2 |
| Comparative Example 4 | 0.63 | $B_1$ | 1 | 20.0 | 100 | 2 |

Note: The melt viscosity of PET was 200 Pa · sec at an inherent viscosity (IV) of 0.63, 800 Pa · sec at IV of 1.0 and 1200 Pa · sec at IV = 1.4.

TABLE 2

| | Intrinsic viscosity of PET film | Dispersed domains of copolyester (B) | | | Young's modulus, MD/TD (x 10$^7$ Pa) | Young's Heat shrinkage MD/TD (%) |
|---|---|---|---|---|---|---|
| | | Form indexes, I, J, K (μm) | Formula (1) of text | Formula (2) of text | | |
| Example 1 | 0.60 | 5.5, 5.0, 0.3 | ○ | ○ | 800/750 | 0.5/0.3 |
| Example 2 | 0.87 | 4.0, 4.0, 0.2 | ○ | ○ | 800/1000 | 0.4/0.5 |
| Example 3 | 1.02 | 3.0, 3.5, 0.1 | ○ | ○ | 900/1100 | 0.6/0.8 |

TABLE 2-continued

|  | Intrinsic viscosity of PET film | Dispersed domains of copolyester (B) | | | Young's modulus, MD/TD (x 10$^7$ Pa) | Young's Heat shrinkage MD/TD (%) |
| --- | --- | --- | --- | --- | --- | --- |
|  |  | Form indexes, I, J, K (μm) | Formula (1) of text | Formula (2) of text |  |  |
| Example 4 | 0.58 | 2.2, 1.8, 0.6 | ○ | ○ | 850/800 | 0.4/0.3 |
| Example 5 | 0.60 | 5.0, 5.0, 0.2 | ○ | ○ | 770/740 | 0.3/0.4 |
| Example 6 | 0.60 | 7.5, 4.0, 0.2 | ○ | ○ | 800/800 | 0.5/0.4 |
| Comparative Example 1 | 0.60 | 35.0, 0.5, 0.2 | X | ○ | 920/500 | 1.0/2.0 |
| Comparative Example 2 | 0.60 | 70.0, 0.2, 0.2 | X | X | 850/550 | 1.2/2.8 |
| Comparative Example 3 | 0.60 | 2.0, 2.0, 2.0 | ○ | X | 550/550 | 12./2.0 |
| Comparative Example 4 | 0.59 | 1.0, 1.0, 1.0 | ○ | X | 520/550 | 1.8/2.5 |

Note: I, J and K are form indexes expressing the average form of the plurality of dispersed domains existing in the film. I is the average value of the maximum lengths of dispersed domains of copolyester (B) in the machine direction of the film; J, that in the transverse direction; and K, that in the normal direction. For the method for deciding the form indexes, see the text. In the columns of the formulae (1) and (2) for the dispersed domains of copolyester (B), ○ mean that the corresponding formula was satisfied, and X, not.

Example 7

(Tables 3 and 4)

Particle-free polyethylene terephthalate with an inherent viscosity of 0.63 (dl/g) was used as the non-liquid crystal polyester (A). A copolyester B$_2$ (melting point 210° C., liquid crystal initiation temperature 185° C., melt viscosity 1 Pa.sec) obtained by polycondensing the following raw materials was used as the copolyester (B).

| [Raw materials of copolyester B$_2$] | |
| --- | --- |
|  | Molar ratio for copolymerization |
| Hydroxybenzoic acid | 42.5 |
| 4,4'-dihydroxybiphenyl | 7.5 |
| Ethylene glycol | 50.0 |
| Terephthalic acid | 57.5 |

A mixture consisting of 99.5 wt % of the polyethylene terephthalate and 0.5 wt % of the copolyester B$_2$ was dried, supplied into a 150 mm single-screw extruder with a barrier flight screw of 28 in the ratio of the length to diameter of the shaft and having a mixing zone at the tip of the screw, melt-mixed and metered at 285° C. at a screw shear rate of 100 second$^{-1}$, fed through a fiber sintered stainless steel filter (10 μm cut) at a shear rate of 10 second$^{-1}$ and extrusion-molded from a T die with a land length of 10 mm at a draw-down ratio of 8 into a sheet, and the sheet was brought into contact with a cooling drum kept at 25° C. while electrostatic charges were applied, to be cooled and solidified. In this case, the polymer cooling rate was kept at 300° C./sec using an air chamber. The holdup of the polymer was 15 minutes. Then, it was sequentially biaxially stretched and heat-treated as described in Example 1, to obtain a 25 μm thick biaxially oriented film. The properties of the obtained film are shown in Table 4. The dispersed domains of the copolyester B$_2$ were smaller than those of the copolyester B$_1$, and as a result, a high quality polyester film with excellent clarity and surface smoothness could be obtained.

Examples 8 to 12

(Table 3 and 4)

Polyester films with a thickness of 25 μm were obtained as described in Example 7, except that the inherent viscosity of PET and the melt viscosity and amount of copolyester B$_2$ were changed. The production conditions are shown in Table 3. When PET with a high inherent viscosity of 1.0 or 1.4 was used, the dispersed domains of the copolyester B$_2$ became smaller than those of Example 7, to improve the clarity and surface smoothness of the film (Examples 8 and 9). When the melt viscosity of the copolyester B$_2$ was raised to keep the melt viscosity ratio (melt viscosity (ηA) of non-liquid crystal polyester (A)/melt viscosity (ηB) of copolyester B) smaller or when the amount of the copolyester B$_2$ was increased, the dispersed domains of the copolyester B$_2$ became large, to increase the haze and surface roughness, though to allowable extents (Examples 10 to 12).

Example 13

(Tables 3 and 4)

Polyester films with a thickness of 25 μm were obtained as described in Example 7, except that the casting conditions. were changed as shown in Table 3. The production conditions are shown in Table 3. At a higher polymer cooing rate and at a higher draw-down ratio, the average thickness (form indicator K) of the dispersed domains of the copolyester B$_2$ became smaller, to improve the surface smoothness of the film (Example 13).

Comparative Examples 5 to 7

(Tables 3 and 4)

Polyester films with a thickness of 25 μm were obtained as described in Example 12, except that the casting conditions were changed as shown in Table 3. When the copolyester B$_2$ was formed as fibrous or laminar dispersed domains at a higher cooling rate and at a higher drawn-down ratio during cooling, the film became poor in clarity and surface smoothness (Comparative Examples 5 and 6). Also when the copolyester B$_2$ was formed as spherical domains by lowering the draw-down ratio on the contrary, the film became poor in both clarity and surface smoothness (Comparative Example 7).

TABLE 3

| | Inherent viscosity of PET pellets | Copolyester (B) | | | Cooling rate during casting [° C./sec] | Draw-down ratio during casting |
|---|---|---|---|---|---|---|
| | | Kind of polymer | Melt viscosity [Pa · sec] | Amount (wt %) | | |
| Example 7 | 0.63 | $B_2$ | 1 | 0.5 | 300 | 8 |
| Example 8 | 1.00 | $B_2$ | 1 | 0.5 | 300 | 8 |
| Example 9 | 1.40 | $B_2$ | 1 | 0.5 | 300 | 8 |
| Example 10 | 0.63 | $B_2$ | 10 | 0.5 | 300 | 8 |
| Example 11 | 0.63 | $B_2$ | 1 | 1.0 | 300 | 8 |
| Example 12 | 0.63 | $B_2$ | 1 | 5.0 | 300 | 8 |
| Example 13 | 0.63 | $B_2$ | 1 | 0.5 | 500 | 10 |
| Comparative Example 5 | 0.63 | $B_2$ | 1 | 5.0 | 300 | 60 |
| Comparative Example 6 | 0.63 | $B_2$ | 1 | 5.0 | 500 | 60 |
| Comparative Example 7 | 0.63 | $B_2$ | 1 | 5.0 | 60 | 2 |

Note: The melt viscosity of PET was 200 Pa · sec at an inherent viscosity (IV) of 0.63, 800 Pa · sec at IV of 1.0 and 1200 Pa · sec at IV = 1.4.

TABLE 4

| | Inherent Viscosity of PET film | Dispersed domains of copolyester (B) | | | Internal haze in terms of 25 μm (%) | SUrface roughness Ra (nm) |
|---|---|---|---|---|---|---|
| | | Form indexes, I, J, K (μm) | Formula (1) of text | Formula (2) of text | | |
| Example 7 | 0.61 | 0.9, 0.8, 0.05 | ○ | ○ | 0.9 | 2.5 |
| Example 8 | 0.90 | 0.4, 0.3, 0.02 | ○ | ○ | 0.6 | 1.5 |
| Example 9 | 1.10 | 0.3, 0.1, 0.02 | ○ | ○ | 0.4 | 1.2 |
| Example 10 | 0.61 | 2.4, 4.0, 0.2 | ○ | ○ | 2.5 | 7.5 |
| Example 11 | 0.60 | 1.0, 1.5, 0.1 | ○ | ○ | 1.2 | 3.5 |
| Example 12 | 0.60 | 2.3, 2.0, 0.2 | ○ | ○ | 1.5 | 6.0 |
| Example 13 | 0.61 | 1.2, 1.5, 0.02 | ○ | ○ | 0.8 | 1.9 |
| Comparative Example 5 | 0.61 | 10.0, 0.3, 0.3 | ○ | X | 11.0 | 17.0 |
| Comparative Example 6 | 0.60 | 20.0, 0.3, 0.14 | X | ○ | 15.0 | 12.0 |
| Comparative Example 7 | 0.60 | 0.7, 0.8, 0.8 | ○ | X | 12.0 | 14.8 |

Examples 14 to 21 and Comparative Examples 8 to 11
(Tables 5 and 6)

These examples and comparative examples show the results of experiments conducted by changing the melt extrusion and casting conditions. Particle-free polyethylene terephthalate with an inherent viscosity of 1.0 (dl/g) was used as the non-liquid crystal polyester (A). A copolyester $B_3$ with a melt viscosity of 5 Pa.sec with the same copolymer composition as that of the copolyester $B_2$ was used as the copolyester (B). A mixture consisting of 98.0 wt % of the polyethylene terephthalate and 2.0 wt % of the copolyester $B_3$ was dried, supplied into a 250 mm single-screw extruder with a barrier flight screw of 32 in the ratio of the length to diameter of the screw, melt-mixed and metered at 285° C. at a screw shear rate of 100 second$^{-1}$, fed through a fiber sintered stainless steel filter (5 μm cut) at a shear rate of 10 second$^{-1}$, and extrusion-molded under the conditions shown in Table 5 into a sheet, and the sheet was brought into contact with a cooling drum kept at 25° C. while electrostatic charges were applied, to be cooled and solidified.

In succession, the cast film was stretched to 4 times at 110° C. in the machine direction by a roll type stretching machine, introduced into a tenter, stretched to 4 times at 120° C., once cooled to lower than 60° C., and re-stretched in the machine direction to 1.3 times at 150° C., and re-stretched in the transverse direction to 1.2 times at 180° C. by a second tenter, heatset at 220° C., and relaxed by 3% in the transverse direction, to obtain 6.5 μm thick biaxially oriented polyester film. The production conditions are shown in Table 5. The properties thus obtained are shown in Table 6.

Even when the polymer cooling rate and draw-down ratio did not conform to the preferable ranges of the present invention, the dispersed domains of the copolyester $B_3$ could be controlled to have the desired forms intended in the present invention by keeping the polymer holdup and the die land length in the preferable ranges. As a result, polyester films high in Young's modulus in both the machine and transverse directions and small in heat shrinkage could be obtained. The production conditions are shown in Table 5. The films obtained were high quality polyester films with good clarity and surface smoothness (Examples 14 to 19). On the other hand, on the contrary to these examples, even when the polymer holdup and the die land length did not conform to the preferable ranges, a film as intended in the present invention could be obtained by keeping the casting conditions such as polymer cooling rate and draw-down ratio in the preferable ranges (Example 20). Furthermore, if the melt extrusion and casting conditions conform to the preferable ranges, a higher quality film reinforced in good balance could be obtained (Example 21).

When the polymer holdup time was extremely shortened, the dispersed domains of the copolyester $B_3$ became spherical, and any film in conformity with the present invention could not be obtained. On the contrary, when the holdup was longer, the molecular weight of the polyethylene terephthalate forming the matrix declined greatly, and any film with high elasticity and low heat shrinkability as intended in the present invention could not be obtained (Comparative Examples 8 and 9). When the land length of the die was as short as 5 mm, the dispersed domains of the copolyester $B_3$ became spherical. On the contrary, when the land length of the die was as long as 100 mm, the dispersed domains became laminar. In these cases, the Young's modulus in the transverse direction of the film could not be raised, and the heat shrinkability became high (Comparative Examples 10 and 11). Furthermore, when the land length of the die was too long, the bolt adjustment of the die became less accurate, to increase the thickness irregularity of the film and to cause frequent film breaking.

TABLE 5

|  | Inherent viscosity of PET pellets | Kind of polymer | Cooling rate during casting (° C./sec) | Draw-down ratio during casting | Holdup [min] | Land length of die [mm] |
| --- | --- | --- | --- | --- | --- | --- |
| Example 14 | 1.0 | $B_3$ | 120 | 2 | 30 | 10.0 |
| Example 15 | 1.0 | $B_3$ | 120 | 2 | 45 | 10.0 |
| Example 16 | 1.0 | $B_3$ | 120 | 2 | 15 | 20.0 |
| Example 17 | 1.0 | $B_3$ | 120 | 2 | 15 | 30.0 |
| Example 18 | 1.0 | $B_3$ | 120 | 2 | 15 | 40.0 |
| Example 19 | 1.0 | $B_3$ | 120 | 2 | 10 | 40.0 |
| Example 20 | 1.0 | $B_3$ | 500 | 10 | 10 | 8.0 |
| Example 21 | 1.0 | $B_3$ | 300 | 8 | 30 | 30.0 |
| Comparative Example 8 | 1.0 | $B_3$ | 120 | 2 | 7 | 8.0 |
| Comparative Example 9 | 1.0 | $B_3$ | 120 | 2 | 80 | 8.0 |
| Comparative Example 10 | 1.0 | $B_3$ | 200 | 2 | 12 | 5.0 |
| Comparative Example 11 | 1.0 | $B_3$ | 120 | 2 | 12 | 100.0 |

TABLE 6

|  | Intrinsic viscosity of PET film | Dispersed domains of copolyester (B) | | | Young's modulus, MD/TD (x $10^7$ Pa) | Heat shrinkage MD/TD (%) |
| --- | --- | --- | --- | --- | --- | --- |
|  |  | Form indexes, I, J, K (μm) | Formula (1) of text | Formula (2) of text |  |  |
| Example 14 | 0.88 | 0.8, 0.9, 0.05 | ○ | ○ | 780/800 | 0.6/0.7 |
| Example 15 | 0.83 | 0.9, 0.8, 0.04 | ○ | ○ | 800/790 | 0.4/0.5 |
| Example 16 | 0.90 | 0.4, 0.8, 0.05 | ○ | ○ | 780/820 | 0.6/0.7 |
| Example 17 | 0.90 | 0.7, 0.6, 0.04 | ○ | ○ | 820/750 | 0.6/0.5 |
| Example 18 | 0.90 | 0.9, 0.5, 0.03 | ○ | ○ | 840/770 | 0.6/0.4 |
| Example 19 | 0.91 | 0.7, 0.6, 0.05 | ○ | ○ | 800/750 | 0.7/0.4 |
| Example 20 | 0.91 | 0.6, 0.7, 0.04 | ○ | ○ | 800/800 | 1.0/0.5 |
| Example 21 | 0.88 | 0.8, 0.7, 0.03 | ○ | ○ | 870/830 | 0.5/0.2 |
| Comparative Example 8 | 0.91 | 0.6, 0.6, 0.5 | ○ | X | 630/600 | 1.8/1.4 |
| Comparative Example 9 | 0.59 | 1.5, 1.3, 1.2 | ○ | X | 600/550 | 1.2/1.5 |
| Comparative Example 10 | 0.90 | 0.6, 0.6, 0.5 | ○ | X | 580/620 | 1.5/1.2 |
| Comparative Example 11 | 0.90 | 14.0, 0.2, 0.08 | X | ○ | 830/440 | 1.6/1.8 |

|  | Internal haze in terms of 25 μm (%) | Surface roughness, Ra (nm) |
| --- | --- | --- |
| Example 14 | 0.8 | 6.0 |
| Example 15 | 0.9 | 6.5 |
| Example 16 | 0.8 | 6.0 |

TABLE 6-continued

| | | |
|---|---|---|
| Example 17 | 0.8 | 6.0 |
| Example 18 | 0.7 | 6.5 |
| Example 19 | 0.8 | 7.0 |
| Example 20 | 1.0 | 8.0 |
| Example 21 | 0.7 | 4.0 |
| Comparative Example 8 | 3.0 | 11.0 |
| Comparative Example 9 | 7.0 | 17.0 |
| Comparative Example 10 | 3.5 | 11.5 |
| Comparative Example 11 | 11.0 | 12.0 |

Example 22 and Comparative Example 12 (Tables 7 and 8)

Particle-free polyethylene naphthalate with an inherent viscosity of 0.62 (dl/g) was used as the non-liquid crystal polyester (A). The copolyester $B_3$ (melt viscosity 5 Pa.sec) was used as the copolyester (B). A mixture consisting of 98.0 wt % of the polyethylene naphthalate and 2.0 wt % of the copolyester $B_3$ was dried, supplied into a 250 mm single-screw extruder with a barrier flight screw of 32 in the ratio of the length to diameter of the shaft, melt-mixed and metered at 305° C. at a screw shear rate of 100 second $^{-1}$, fed through a fiber sintered stainless steel filter (5 μm cut) at a shear rate of 10 second$^{-1}$, and extrusion-molded into a sheet under the conditions shown in Table 7, and the sheet was brought into contact with a cooling drum kept at 25° C. while electrostatic charges were applied, to be cooled and solidified. In succession, the cast film was stretched to 4.5 times at 130° C. in the machine direction by a roll type stretching machine, introduced into a tenter, stretched to 5.5 times at 135° C., once cooled to lower than 100° C., re-stretched at 170° C. to 1.15 times in the machine direction of the film, re-stretched in the transverse direction at 190° C. to 1.1 times by a second tenter, heatset at 220° C. and relaxed by 3% in the transverse direction, to obtain a 6.5 μm thick biaxially oriented polyester film. The production conditions are shown in Table 7. Also when polyethylene naphthalate was used as the non-liquid crystal polyester (A), the dispersed domains of the copolyester $B_3$ had desired forms, to provide a film improved in elastic modulus and low in heat shrinkage, by keeping the melt extrusion and casting conditions in the preferable ranges of the present invention.

Example 23 and Comparative Example 13 (Tables 7 and 8)

Polyester films with a thickness of 6.5 μm were obtained as described in Example 21 or Comparative Example 8, except that a copolymer consisting of PET and PEN (consisting of 90 mol % of PET and 10 mol % of PEN, IV=1.0) was used as the non-liquid crystal polyester (A). The production conditions are shown in Table 7. According to the preferable production method disclosed in the present invention, the film obtained also in this case was improved in mechanical properties, clarity and surface smoothness.

TABLE 7

| | Non-liquid crystal polyester (A) | | Copolyester (B) | | |
|---|---|---|---|---|---|
| | | | | Melt | |
| | Kind of polymer | Inherent viscosity | Kind of polymer | viscosity [Pa · sec] | Amount [wt %] |
| Example 22 | PEN | 0.62 | $B_3$ | 5 | 2.0 |
| Example 23 | PET/PEN | 0.62 | $B_3$ | 5 | 2.0 |
| Comparative Example 12 | PEN | 0.62 | $B_3$ | 5 | 2.0 |
| Comparative Example 13 | PET/PEN | 0.62 | $B_3$ | 5 | 2.0 |

| | Cooling rate during casting (° C./sec) | Draw-down ratio during casting | Holdup [min] | Land length of die [mm] |
|---|---|---|---|---|
| Example 22 | 300 | 8 | 30 | 30.0 |
| Example 23 | 300 | 8 | 30 | 30.0 |
| Comparative Example 12 | 120 | 2 | 10 | 8.0 |
| Comparative Example 13 | 120 | 2 | 10 | 8.0 |

TABLE 8

| | Intrinsic viscosity of PET film | Dispersed domains of copolyester (B) | | | Young's modulus, MD/TD (x 10$^7$ Pa) | Heat shrinkage MD/TD (%) |
|---|---|---|---|---|---|---|
| | | Form indexes, I, J, K (μm) | Formula (1) of text | Formula (2) of text | | |
| Example 22 | 0.59 | 0.3, 0.2, 0.02 | ○ | ○ | 870/950 | 0.3/0.2 |
| Example 23 | 0.87 | 0.8, 0.6, 0.05 | ○ | ○ | 830/770 | 1.1/0.5 |
| Comparative Example 12 | 0.59 | 0.20, 0.12, 0.15 | ○ | X | 600/700 | 0.6/0.3 |
| Comparative Example 13 | 0.87 | 0.4, 0.5, 0.3 | ○ | X | 530/620 | 0.6/0.7 |

TABLE 8-continued

|  | Internal haze in terms of 25 $\mu$m (%) | Surface roughness, Ra ($\mu$m) |
| --- | --- | --- |
| Example 22 | 0.4 | 3.0 |
| Example 23 | 0.9 | 5.0 |
| Comparative Example 12 | 1.0 | 6.0 |
| Comparative Example 13 | 2.8 | 11.0 |

Example 24

(Tables 9 to 11)

Particle-free polyethylene terephthalate (melting point 258° C., cooling crystallization initiation temperature 230° C.) with an inherent viscosity of 0.63 (dl/g) was used as the non-liquid crystal polyester (A). The copolyester $B_1$ was used as the copolyester (B). A mixture consisting of 80 wt % of the polyethylene terephthalate and 20.0 wt % of the copolyester $B_1$ was dried and melt-kneaded by a two-shaft kneading machine, to prepare master chips with the copolyester $B_1$ finely dispersed at a size of about 10 $\mu$m. Then, a mixture consisting of 50.0 wt % of the polyethylene terephthalate and 50.0 wt % of the master chips containing 20% of the copolyester $B_1$ was dried, supplied into a 150 mm single-screw extruder with a barrier flight screw of 28 in the ratio of the length to diameter of the shaft, melt-mixed and metered at 285° C. at a screw shear rate of 100 second$^{-1}$, fed through a fiber sintered stainless steel filter (5 $\mu$m cut) at a shear rate of 10 second$^{-1}$, and extrusion-molded with the polymer temperature in the T die set at 240° C. using a T die with a land length of 30 mm at a draw-down ratio of 10 into a sheet. The sheet was brought into contact with a cooling drum kept at 25° C. while electrostatic charges were applied, to be cooled and solidified. In this case, the polymer cooling rate was controlled at 300° C./sec using an air chamber. In succession, the cast film was stretched to 4 times at 95° C. in the machine direction by a roll type stretching machine, introduced into a tenter, stretched to 4 times at 95° C., once cooled to 60° C. and heatset at 230° C., to obtain a 25 $\mu$m thick biaxially oriented polyester film. The production conditions are shown in Table 9. The morphology of the copolyester $B_1$ in the obtained film is shown in Table 10, and the film properties are shown in Table 11. The copolyester $B_1$ was finely dispersed in domains formed to satisfy the formulae (1) and (2), and the Qc/Qs of the film was 10. Thus, a high quality polyester film high in Young's modulus and excellent in surface slipperiness and abrasion resistance could be obtained.

Examples 25 to 30

(Tables 9 to 11) Polyester films were obtained as described in Example 24, except that the inherent viscosity of PET, the amount and melt viscosity of the copolyester $B_1$ and casting conditions (the polymer temperature in the die and the draw-down ratio) were changed. The production conditions are shown in Table 9. In the examples of the present invention, the stretching temperature and ratio in the machine direction were set at 115° C. and 4.5 times respectively, and the stretching temperature and ratio in the transverse direction were set at 130° C. and 5.0 times respectively.

When the inherent viscosity of PET was higher, the domains in the central layer were more highly oriented, to make the value of Qc/Qs larger, and polyester films higher in Young's modulus than the polyester film of Example 24 were obtained (Examples 25 and 26). Furthermore, also when the amount and melt viscosity of the copolyester $B_1$ and the melt extrusion temperature were changed, melt extrusion at a temperature lower than the melting point of PET and higher than the cooling crystallization initiation temperature made the value of Qc/Qs of the copolyester $B_1$ larger, and polyester films high in Young's modulus and excellent in surface properties could be obtained (Examples 27 to 30).

Examples 31 and 32

(Tables 9 to 11)

Polyester films were obtained as described in Example 26, except that the temperature in the T die was set at 260° C. (Example 31) or 285° C. (Example 32). The production conditions are shown in Table 9. Compared to the polyester film of Example 26, the polyester films of Examples 31 and 32 tended to be smaller in Qc/Qs, but were good in surface slipperiness and abrasion resistance.

Example 33

(Tables 9 to 11)

Particle-free polyethylene terephthalate with an inherent viscosity of 0.63 (dl/g) was used as the non-liquid crystal polyester (A). A copolyester $B_4$ (melting point 210° C., liquid crystal initiation temperature 1850C) with a melt viscosity of 3 Pa.sec with the same copolymer composition as that of the copolyester $B_2$ was used as the copolyester (B).

A mixture consisting of 98.0 wt % of the polyethylene terephthalate and 2.0 wt % of the copolyester $B_4$ was dried, supplied into a 150 mm single-screw extruder with a barrier flight screw of 28 in the ratio of the length to diameter of the shaft and with a mixing zone at the tip of the screw, melt-mixed and metered at 285° C. at a screw shear rate of 100 second$^{-1}$, fed through a fiber sintered stainless steel filter (1 $\mu$m cut) at a shear rate of 10 second$^{-1}$, and extrusion-molded using a T die with a land length of 30 mm with the polymer temperature kept at 240° C. at a draw-down ratio of 10 into a sheet, and the sheet was brought into contact with a cooling drum kept at 25° C. while electrostatic charges were applied, to be cooled and solidified. In this case, the polymer cooling rate was controlled to 300° C./sec using an air chamber. Then, it was sequentially biaxially stretched and heat-treated as described in Example 24, to obtain a biaxially oriented polyester film. The production conditions are shown in Table 9. The copolyester $B_4$ was better in fine dispersibility than the copolyester $B_1$ used in said example, and thus, a high quality polyester film high in Young's modulus and good in surface slipperiness and abrasion resistance could be obtained.

Examples 34 to 36
(Tables 9 to 11)

Polyester films were obtained as described in Example 31, except that the inherent viscosity of PET, the amount of the copolyester $B_4$ and extrusion and casting conditions (polymer temperature and draw-down ratio) were changed. The production conditions are shown in Table 9. In these examples, the stretching temperature and ratio in the machine direction were set at 115° C. and 4.5 times respectively and the stretching temperature and ratio in the transverse direction were set at 130° C. and 5.0 times respectively. The trends by increase of molecular weight observed in Examples 24 to 26 were also observed when the copolyester $B_4$ was used. When PET with a high inherent viscosity of 1.0 or 1.4 was used, the dispersed domains of the copolyester $B_4$ became small, and the Young's modulus of the polyester film was improved (Examples 34 and 35). When the amount of the copolyester $B_4$ was decreased to 0.5 wt %, the Young's modulus of the film became somewhat small, but also in this case, a high quality polyester film excellent in surface properties could be obtained (Example 36).

Example 37

A polyester film was obtained as described in Example 35, except that the temperature in the T die was set at 285° C. The production conditions are shown in Table 9. In Example 37, Qc/Qs tended to be small, but the value was still conform to the present invention. The film obtained was good in surface slipperiness and abrasion resistance.

Examples 38 and 39

Biaxially oriented polyester films were obtained as described in Example 24 or 33, except that polyethylene-2, 6-naphthalate (PEN: melting point 262° C.) with an inherent viscosity of 0.62 was used as the non-liquid crystal polyester (A). The production conditions are shown in Table 9. In these examples, the stretching temperature and ratio in the machine direction were set at 135° C. and 5.0 times respectively, and the stretching temperature and ratio in the transverse direction were set at 140° C. and 5.0 times respectively. In the films thus obtained, the dispersed domains of the copolyester $B_1$ or $B_4$ were smaller than those of the PET films of Examples 24 and 33. Furthermore, the ratio of aspect ratio of the dispersed domains in the central portion to that in the surface portion, Qc/Qs became larger, and polyester films high in Young's modulus and excellent in surface properties could be obtained.

TABLE 9

|  | Inherent viscosity of non-liquid crystal polyester | Copolyester (B) | | | Polymer temperature during casting [° C] | Draw-down ratio during casting |
|---|---|---|---|---|---|---|
|  |  | Kind of polymer | Melt viscosity [Pa · sec] | Amount (wt %) |  |  |
| Example 24 | PET/0.63 | $B_1$ | 10 | 10.0 | 240 | 10 |
| Example 25 | PET/1.00 | $B_1$ | 10 | 10.0 | 240 | 10 |
| Example 26 | PET/1.40 | $B_1$ | 10 | 10.0 | 240 | 10 |
| Example 27 | PET/1.00 | $B_1$ | 10 | 1.0 | 240 | 10 |
| Example 28 | PET/1.00 | $B_1$ | 1 | 1.0 | 240 | 10 |
| Example 29 | PET/1.00 | $B_1$ | 10 | 10.0 | 235 | 10 |
| Example 30 | PET/1.00 | $B_1$ | 10 | 10.0 | 250 | 50 |
| Example 31 | PET/1.40 | $B_1$ | 10 | 10.0 | 260 | 10 |
| Example 32 | PET/1.40 | $B_1$ | 10 | 10.0 | 285 | 10 |
| Example 33 | PET/0.63 | $B_4$ | 3 | 2.0 | 240 | 10 |
| Example 34 | PET/1.00 | $B_4$ | 3 | 2.0 | 240 | 10 |
| Example 35 | PET/1.40 | $B_4$ | 3 | 2.0 | 240 | 10 |
| Example 36 | PET/1.00 | $B_4$ | 3 | 0.5 | 240 | 10 |
| Example 37 | PET/1.40 | $B_4$ | 3 | 2.0 | 285 | 10 |
| Example 38 | PEN/0.62 | $B_1$ | 10 | 10.0 | 240 | 10 |
| Example 39 | PEN/0.62 | $B_4$ | 3 | 2.0 | 240 | 10 |

Note: The melt viscosity of PET was 200 Pa · sec at an inherent viscosity (IV) of 0.63, 800 Pa · sec at IV of 1.0 and 1200 Pa · sec at IV of 1.4. The melt viscosity of PEN was 700 Pa · sec at an inherent viscosity (IV) of 0.62.

TABLE 10

|  | Dispersed domains of copolyester (B) | | | | | |
|---|---|---|---|---|---|---|
|  | Form indexes, I, J, K (μm) | Formula (1) of text | Formula (2) of text | Average major axis L of surface portion (nm) | Qs of surface portion | Ratio of aspect ratios (Qc/Qs) |
| Example 24 | 3.0, 0.9, 0.4 | ○ | ○ | 1.2 | 1.5 | 10.0 |
| Example 25 | 10.0, 0.7, 0.2 | ○ | ○ | 0.7 | 1.4 | 40.0 |
| Example 26 | 15.0, 0.5, 0.2 | ○ | ○ | 0.6 | 1.5 | 70.0 |

TABLE 10-continued

| | | Dispersed domains of copolyester (B) | | | | |
|---|---|---|---|---|---|---|
| | Form indexes, I, J, K (μm) | Formula (1) of text | Formula (2) of text | Average major axis L of surface portion (nm) | Qs of surface portion | Ratio of aspect ratios (Qc/Qs) |
| Example 27 | 8.0, 0.8, 0.3 | ○ | ○ | 0.7 | 1.4 | 45.0 |
| Example 28 | 5.0, 0.5, 0.1 | ○ | ○ | 0.6 | 1.5 | 35.0 |
| Example 29 | 10.0, 0.6, 0.2 | ○ | ○ | 0.8 | 1.6 | 50.0 |
| Example 30 | 5.0, 0.6, 0.2 | ○ | ○ | 1.0 | 2 | 19.0 |
| Example 31 | 8.0, 1.0, 0.2 | ○ | ○ | 0.7 | 1.2 | 5.0 |
| Example 32 | 5.0, 2.0, 0.3 | ○ | ○ | 0.8 | 1.1 | 4.0 |
| Example 33 | 1.5, 0.2, 0.05 | ○ | ○ | 0.3 | 1.5 | 20.0 |
| Example 34 | 3.5, 0.2, 0.04 | ○ | ○ | 0.3 | 2 | 45.0 |
| Example 35 | 2.5, 0.1, 0.02 | ○ | ○ | 0.15 | 1.5 | 80.0 |
| Example 36 | 2.0, 0.2, 0.05 | ○ | ○ | 0.1 | 1 | 60.0 |
| Example 37 | 2.0, 0.2, 0.03 | ○ | ○ | 0.2 | 1.2 | 5.0 |
| Example 38 | 4.0, 0.5, 0.15 | ○ | ○ | 0.5 | 1 | 40.0 |
| Example 39 | 2.0, 0.15, 0.04 | ○ | ○ | 0.1 | 1 | 35.0 |

Note: For the methods of deciding the average major axis L, average minor axis D, and the ratio of aspect ratio L/D of domains of copolyester (B) in the portion to that in the surface portion (Qc/Qs), see the text.

TABLE 11

| | Inherent viscosity of PET film | Young's modulus MD/TD (x $10^7$ Pa) | Surface properties of film | | |
|---|---|---|---|---|---|
| | | | Surface roughness Ra (nm) | Coefficient of friction (slipperiness) | Abrasion resistance (number of flaws) |
| Example 24 | 0.59 | 720/630 | 12 | 0.27 | 5 |
| Example 25 | 0.87 | 820/680 | 9 | 0.24 | 4 |
| Example 26 | 1.08 | 900/760 | 7 | 0.23 | 1 |
| Example 27 | 0.85 | 789/700 | 7 | 0.23 | 3 |
| Example 28 | 0.92 | 770/690 | 4 | 0.21 | 2 |
| Example 29 | 0.88 | 880/640 | 8 | 0.24 | 1 |
| Example 30 | 0.84 | 770/700 | 8 | 0.23 | 5 |
| Example 31 | 1.02 | 870/730 | 10 | 0.25 | 4 |
| Example 32 | 0.95 | 840/700 | 11 | 0.27 | 6 |
| Example 33 | 0.57 | 700/610 | 4 | 0.26 | 5 |
| Example 34 | 0.81 | 810/670 | 3 | 6.25 | 4 |
| Example 35 | 1.04 | 930/680 | 2 | 0.24 | 1 |
| Example 36 | 0.82 | 760/620 | 2 | 0.23 | 1 |
| Example 37 | 0.99 | 900/660 | 6 | 0.27 | 4 |
| Example 38 | 0.58 | 1050/750 | 7 | 0.27 | 6 |
| Example 39 | 0.57 | 990/850 | 3 | 0.24 | 7 |

Example 40
(Tables 12 and 13)

Polyethylene terephthalate with an inherent viscosity of 0.8 (dl/g) was used as the non-liquid crystal polyester (A). The copolyester $B_1$ was used as the copolyester (B). A mixture consisting of 99.5 wt % of the polyethylene terephthalate and 0.5 wt % of the copolyester $B_1$ was dried, supplied into a 250 mm single-screw extruder with a barrier flight screw of 28 in the ratio of the length to diameter of the shaft, melt-mixed and metered at 285° C. at a screw shear rate of 100 second$^{-1}$, fed through a fiber sintered stainless steel filter (80 μm cut) at a shear rate of 10 second$^{-1}$, and extrusion-molded from a T die with a land length of 10 mm at a draw-down ratio of 8 into a sheet, and the sheet was brought into contact with the cooling drum kept at 25° C. while electrostatic charges were applied, to be cooled and solidified. In this case, the film was cooled in an air chamber to keep the polymer cooling rate at 300° C./sec. The holdup of the polymer was 15 minutes. The cast film was stretched to 3.4 times at 95° C. in the machine direction by a roll type stretching machine, introduced into a tenter, stretched at 150° C. to 3.6 times, once cooled to 60° C., and heatset at 245° C., to obtain a 250 μm thick biaxially oriented film. The production conditions are shown in Table 12.

The properties thus obtained are shown in Table 13. In this film, the copolyester $B_1$ was finely dispersed to have forms satisfying the formulae (1) and (2), and a high quality polyester film excellent in long-time thermostability could be obtained.

Comparative Examples 14 and 15
(Tables 12 and 13)

Polyester films with a thickness of 250 μm were obtained as described in Example 40, except that the casting conditions were changed as shown in Table 12. When the dispersed domains of the copolyester $B_1$ did not have forms satisfying the formulae (1) or (2), long-time thermostability declined compared that in Example 40.

TABLE 12

| | Inherent viscosity of PET pellets | Copolyester (B) | | Cooling rate during casting [° C./sec] | Draw-down ratio during casting |
| --- | --- | --- | --- | --- | --- |
| | | Kind of polymer | Melt viscosity [Pa · sec] | Amount (wt %) | | |
| Example 40 | 0.80 | $B_1$ | 10 | 0.5 | 300 | 8 |
| Comparative Example 14 | 0.80 | $B_1$ | 10 | 0.5 | 500 | 60 |
| Comparative Example 15 | 0.80 | $B_1$ | 10 | 0.5 | 300 | 70 |

Note: The melt viscosity of PET was 600 Pa · sec at IV of 0.8.

TABLE 13

| | Inherent viscosity of PET film | Dispersed domains of copolyester (B) | | | Long-time thermostability, MD/TD (hours) |
| --- | --- | --- | --- | --- | --- |
| | | Form indexes, I, J, K (μm) | Formula (1) of text | Formula (2) of text | |
| Example 40 | 0.70 | 5.6, 4.9, 0.3 | ○ | ○ | 90/90 |
| Comparative Example 14 | 0.70 | 36.0, 0.5, 0.2 | X | ○ | 80/50 |
| Comparative Example 15 | 0.70 | 73.0, 0.2, 0.2 | X | X | 85/45 |

INDUSTRIAL APPLICABILITY

The present invention is a polyester film composed of a non-liquid crystal polyester (A) and a copolyester (B) containing mesogen groups in the main chain to form a phase separated structure in the non-liquid crystal polyester (A), which is improved in such quality as rigidity, heat shrinkage, clarity, long-time thermostability and surface properties by letting the copolyester (B) have dispersed domains with specific geometrical forms, It can be used for various applications such as magnetic recording, electric insulation, heat sensitive transfer ribbon, heat sensitive stencil printing, packaging, etc.

We claim:

1. A polyester film, having at least one surface portion and a central portion, comprising a non-liquid crystal polyester (A) and a copolyester (B), said copolyester (B) containing mesogen groups in the main chain to form a phase separated structure in said non-liquid crystal polyester (A), said copolyester (B) having dispersed domains, wherein forms of said dispersed domains satisfy the following formulae (1) and (2):

$$0.02 < (I/J) < 50 \tag{1}$$

$$K < \tfrac{1}{2} \times S[I, J] \tag{2}$$

where I, J and K are form indicators expressing the average form of the plurality of domains existing in the film: I is the average length of said dispersed domains of said copolyester (B) in the machine direction of the film; J, the average length of said dispersed domains of said copolyester (B) in the transverse direction; and K, the average length of said dispersed domains of said copolyester (B) in the normal direction: and S is a function for selection the shorter value of the lengths I and J; if I>J, S means J, and if I<J, S means I.

2. A polyester film, according to claim 1, wherein the ratio (I/J) of said average length (I) of the dispersed domains formed by the copolyester (B) in the machine direction of said film to the average length (J) in the transverse direction is 0.04 to 25.0, and the average length (K) in the normal direction is 0.001 to 10 μm.

3. A polyester film, according to claim 1 composed of a non-liquid crystal polyester (A) and a copolyester (B) to form a phase separated structure in said non-liquid crystal polyester (A), wherein the aspect ratio L/D of the average major axis L of the dispersed domains to the average minor axis D of said copolyester (B) in at least one of said surface portions of the film is smaller than the L/D of the dispersed domains in said central portion of the film.

4. A polyester film, according to claim 3 wherein the ratio Qc/Qs is 2 to 300, wherein Qc is the L/D of said dispersed domains of said copolyester (B) in said central portion of said film, and Qs is the L/D in said surface portion of said film.

5. A polyester film, according to claim 4 wherein the Qs of said dispersed domains of said copolyester (B) in said surface portion of said film is 1 to 20, and the average major axis L is 0.01 to 3 μm.

6. A polyester film, according to claim 1, wherein the copolymer amount of said mesogen groups in the main chain is 5 to 95 mol %.

7. A polyester film, according to claim 1 wherein said copolyester (B) is at least one selected from the group consisting of a copolyester composed of the structural components (I), (III) and (IV), a copolyester composed of the structural components (I), (III), and (IV), and a copolyester composed of the structural components (I), (II), (III) and (IV), wherein structural components (I), (II), (III) and (IV) are:

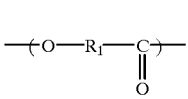
(I)

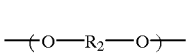
(II)

-continued

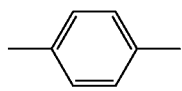    (III)

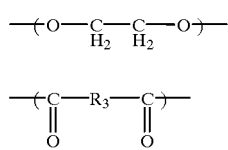    (IV)

wherein R₁ stands for

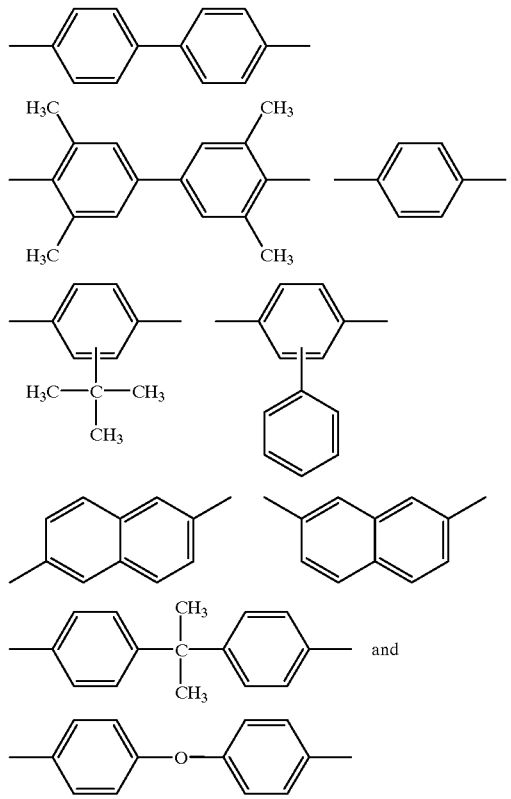

R₂ stands for one or more groups selected from the group consisting of

R₃ stands for one or more groups selected from the group consisting of

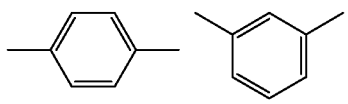

wherein X stands for a hydrogen atom or chlorine atom; and the moles of the structural components (II)+(III) are substantially equal to the moles of the structural component (IV).

8. A polyester film, according to claim 1 wherein ηA/ρB is 5 or more, wherein ηA/ρB is the ratio of the melt viscosity of the non-liquid crystal polyester (A) to that of the copolyester (B).

9. A polyester film, according to claim 1 wherein the copolyester (B) comprises 0.01 to 40 wt % of said polyester film.

10. A polyester film, according to claim 1 wherein said non-liquid crystal polyester (A) is at least one selected from the group consisting of polyethylene terephthalate, polyethylene naphthalate and their modification products, and wherein said non-liquid crystal polyester (A) has an inherent viscosity of 0.6 or more.

11. A polyester film, according to claim 1 wherein the sum of the Young's modulus of the polyester film in the machine direction and the Young's modulus in the transverse direction is 8 to 30 GPa.

12. A polyester film, according to claim 1 wherein the sum of heat shrinkage at 100° C. for 30 minutes of the polyester film in the machine direction and heat shrinkage at 100° C. for 30 minutes in the transverse direction is 3% or less.

13. A polyester film, according to claim 1 wherein said film has a haze of 0.1 to 10%.

14. A polyester film, according to claim 1, wherein the surface roughness Ra of the film is 0.5 to 100 nm.

15. The polyester film according to claim 14, wherein the coefficient of dynamic friction of the film is 0.3 μk or less.

* * * * *

UNITED STATES PATENT AND TRADEMARK OFFICE
CERTIFICATE OF CORRECTION

PATENT NO. : 6,090,898
DATED : July 18, 2000
INVENTOR(S) : Tsunekawa et al

It is certified that error appears in the above-indentified patent and that said Letters Patent is hereby corrected as shown below:

In Column 1, at line 15, please delete "and" before "thermal".

In Column 12, at line 25, please change "mostly" to --substantially--.

In Column 33, at Table 11, at the subheading "Coefficient of friction" at "Example 34", please change "6.25" to --0.25--.

In Column 25, at line 39, please change "ribbon" to --ribbons--.

Signed and Sealed this

Seventeenth Day of April, 2001

*Attest:*

NICHOLAS P. GODICI

*Attesting Officer*      *Acting Director of the United States Patent and Trademark Office*